United States Patent
Khoshnevisan et al.

(10) Patent No.: US 11,831,571 B2
(45) Date of Patent: Nov. 28, 2023

(54) TRANSPORT BLOCK TRANSMISSION USING DIFFERENT SPATIAL PARAMETERS

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 16/598,996

(22) Filed: Oct. 10, 2019

(65) Prior Publication Data

US 2020/0136770 A1 Apr. 30, 2020

Related U.S. Application Data

(60) Provisional application No. 62/753,517, filed on Oct. 31, 2018.

(51) Int. Cl.
*H04L 5/00* (2006.01)
*H04W 72/0446* (2023.01)
(Continued)

(52) U.S. Cl.
CPC .......... *H04L 5/0023* (2013.01); *H04L 5/0051* (2013.01); *H04L 5/0082* (2013.01);
(Continued)

(58) Field of Classification Search
CPC ... H04L 5/0023; H04L 5/0051; H04L 5/0082; H04L 5/10; H04L 5/0094; H04L 5/0044;
(Continued)

(56) References Cited

U.S. PATENT DOCUMENTS 9,154,352 B2   10/2015  Palanki et al.
10,485,003 B2 * 11/2019  Zhang ............... H04W 72/0493
(Continued)

FOREIGN PATENT DOCUMENTS

CN   107040487 A   8/2017
CN   108631910 A   10/2018
(Continued)

OTHER PUBLICATIONS

Docomo N., et al., "Layer 1 Enhancements for NR URLLC", 3GPP Draft, R1-1811378 Eurllc L1 Enhancement, 3rd Generation Partnership Project (3GPP), Mobile Competence Centre, 650, Route Des Lucioles, F-06921 Sophia-Antipolis Cedex, France, vol. RAN WG1, No. Chengdu, China; Oct. 8 2018-Oct. 12, 2018, Sep. 29, 2018 (Sep. 29, 2018), XP051518782, 18 Pages, Retrieved from the Internet, URL: http://www.3gpp.org/ftp/tsg%5Fran/WG1%5FRL1/TSGR1%5F94b/Docs/R1%2D1811378%2Ezip [retrieved on Sep. 29, 2018].
(Continued)

*Primary Examiner* — Habte Mered
(74) *Attorney, Agent, or Firm* — QUALCOMM INCORPORATED

(57) ABSTRACT

Various aspects of the present disclosure generally relate to wireless communication. In some aspects, a wireless communication device may determine a first set of parameters associated with a first transport block (TB) repetition of a TB and a second set of parameters associated with a second TB repetition of the TB; and determine a TB size of the TB based at least in part on the first set of parameters, the second set of parameters, or both the first set of parameters and the second set of parameters. Numerous other aspects are provided.

17 Claims, 13 Drawing Sheets

(51) Int. Cl.
*H04W 76/27* (2018.01)
*H04L 5/10* (2006.01)
*H04W 72/23* (2023.01)

(52) U.S. Cl.
CPC ............ *H04L 5/10* (2013.01); *H04W 72/0446* (2013.01); *H04W 72/23* (2023.01); *H04W 76/27* (2018.02)

(58) Field of Classification Search
CPC ....... H04L 1/08; H04L 1/0078; H04L 1/0006; H04W 72/0446; H04W 76/27; H04W 72/014
See application file for complete search history.

(56) References Cited

U.S. PATENT DOCUMENTS

| 10,966,194 | B2 | 3/2021 | Chen et al. | |
|---|---|---|---|---|
| 2019/0036640 | A1* | 1/2019 | Xu | H04L 1/0009 |
| 2019/0230689 | A1* | 7/2019 | Cao | H04L 27/2602 |
| 2019/0296861 | A1* | 9/2019 | Zou | H04L 1/1812 |
| 2019/0342910 | A1 | 11/2019 | Cao et al. | |
| 2020/0106559 | A1* | 4/2020 | Vilaipornsawai | H04L 5/0023 |
| 2020/0296704 | A1* | 9/2020 | Vilaipornsawai | H04L 1/08 |
| 2021/0194656 | A1* | 6/2021 | Luo | H04L 5/0044 |
| 2021/0226748 | A1* | 7/2021 | Frenne | H04W 72/0446 |
| 2021/0274527 | A1* | 9/2021 | Nakamura | H04L 5/0044 |
| 2021/0314094 | A1* | 10/2021 | Gao | H04L 1/1896 |

FOREIGN PATENT DOCUMENTS

| WO | 2010124033 | A2 | 10/2010 |
|---|---|---|---|
| WO | 2016119232 | A1 | 8/2016 |
| WO | 2016167921 | | 10/2016 |

OTHER PUBLICATIONS

Partial International Search Report—PCT/US2019/055838—ISA/EPO—dated Jan. 24, 2020.
International Search Report and Written Opinion—PCT/US2019/055838—ISA/EPO—dated Mar. 18, 2020.

* cited by examiner

TRANSPORT BLOCK TRANSMISSION USING DIFFERENT SPATIAL PARAMETERS

CROSS-REFERENCE TO RELATED APPLICATION

This application claims priority to U.S. Provisional Patent Application No. 62/753,517, filed on Oct. 31, 2018, entitled "TRANSPORT BLOCK TRANSMISSION USING DIFFERENT SPATIAL PARAMETERS," which is hereby expressly incorporated by reference herein.

FIELD OF THE DISCLOSURE

Aspects of the present disclosure generally relate to wireless communication and to techniques and apparatuses for transport block transmission using different spatial parameters.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include determining a first set of parameters associated with a first transport block (TB) repetition of a TB and a second set of parameters associated with a second TB repetition of the TB; and determining a TB size of the TB based at least in part on the first set of parameters, the second set of parameters, or both the first set of parameters and the second set of parameters.

In some aspects, a wireless communication device may include memory and one or more processors operatively coupled to the memory. The memory and the one or more processors may be configured to determine a first set of parameters associated with a first transport block (TB) repetition of a TB and a second set of parameters associated with a second TB repetition of the TB; and determine a TB size of the TB based at least in part on the first set of parameters, the second set of parameters, or both the first set of parameters and the second set of parameters.

In some aspects, a non-transitory computer-readable medium may store one or more instructions for wireless communication. The one or more instructions, when executed by one or more processors of a wireless communication device, may cause the one or more processors to determine a first set of parameters associated with a first transport block (TB) repetition of a TB and a second set of parameters associated with a second TB repetition of the TB; and determine a TB size of the TB based at least in part on the first set of parameters, the second set of parameters, or both the first set of parameters and the second set of parameters.

In some aspects, an apparatus for wireless communication may include means for determining a first set of parameters associated with a first transport block (TB) repetition of a TB and a second set of parameters associated with a second TB repetition of the TB; and means for determining a TB size of the TB based at least in part on the first set of parameters, the second set of parameters, or both the first set of parameters and the second set of parameters.

In some aspects, a method of wireless communication, performed by a base station, may include; transmitting a grant for a first TB repetition, wherein the grant indicates a first mini-slot in which the first TB repetition is scheduled; and scheduling one or more subsequent TB repetitions in one or more subsequent mini-slots that occur after the first mini slot, wherein the one or more subsequent mini-slots are determined based at least in part on a mini-slot pattern configuration or one or more parameters of the first TB repetition.

In some aspects, a base station for wireless communication may include memory and one or more processors operatively coupled to the memory. The memory and the one or more processors may be configured to transmit a grant for a first TB repetition, wherein the grant indicates a first mini-slot in which the first TB repetition is scheduled; and schedule one or more subsequent TB repetitions in one or more subsequent mini-slots that occur after the first mini slot, wherein the one or more subsequent mini-slots are determined based at least in part on a mini-slot pattern configuration or one or more parameters of the first TB repetition.

In some aspects, a non-transitory computer-readable medium may store one or more instructions for wireless communication. The one or more instructions, when executed by one or more processors of a base station, may cause the one or more processors to transmit a grant for a first TB repetition, wherein the grant indicates a first mini-slot in which the first TB repetition is scheduled; and schedule one or more subsequent TB repetitions in one or more subsequent mini-slots that occur after the first mini slot, wherein the one or more subsequent mini-slots are determined based at least in part on a mini-slot pattern configuration or one or more parameters of the first TB repetition.

In some aspects, an apparatus for wireless communication may include means for transmitting a grant for a first TB repetition, wherein the grant indicates a first mini-slot in which the first TB repetition is scheduled; and means for scheduling one or more subsequent TB repetitions in one or more subsequent mini-slots that occur after the first mini slot, wherein the one or more subsequent mini-slots are determined based at least in part on a mini-slot pattern configuration or one or more parameters of the first TB repetition.

In some aspects, a method of wireless communication, performed by a user equipment (UE), may include receiving a grant for a first TB repetition, wherein the grant indicates a first mini-slot in which the first TB repetition is scheduled; and determining one or more subsequent mini-slots, that occur after the first mini slot, in which one or more subsequent TB repetitions are scheduled based at least in part on a mini-slot pattern configuration or one or more parameters of the first TB repetition.

In some aspects, a UE for wireless communication may include memory and one or more processors operatively coupled to the memory. The memory and the one or more processors may be configured to receive a grant for a first TB repetition, wherein the grant indicates a first mini-slot in which the first TB repetition is scheduled; and determine one or more subsequent mini-slots, that occur after the first mini slot, in which one or more subsequent TB repetitions are scheduled based at least in part on a mini-slot pattern configuration or one or more parameters of the first TB repetition.

In some aspects, a non-transitory computer-readable medium may store one or more instructions for wireless communication. The one or more instructions, when executed by one or more processors of a UE, may cause the one or more processors to receive a grant for a first TB repetition, wherein the grant indicates a first mini-slot in which the first TB repetition is scheduled; and determine one or more subsequent mini-slots, that occur after the first mini slot, in which one or more subsequent TB repetitions are scheduled based at least in part on a mini-slot pattern configuration or one or more parameters of the first TB repetition.

In some aspects, an apparatus for wireless communication may include means for receiving a grant for a first TB repetition, wherein the grant indicates a first mini-slot in which the first TB repetition is scheduled; and means for determining one or more subsequent mini-slots, that occur after the first mini slot, in which one or more subsequent TB repetitions are scheduled based at least in part on a mini-slot pattern configuration or one or more parameters of the first TB repetition.

In some aspects, a method of wireless communication, performed by a base station, may include transmitting an indication of a first set of symbols and a second set of symbols in which a single communication is scheduled; and transmitting or receiving the single communication in the first set of symbols and the second set of symbols using a first spatial parameter for the first set of symbols and a second spatial parameter for the second set of symbols.

In some aspects, a base station for wireless communication may include memory and one or more processors operatively coupled to the memory. The memory and the one or more processors may be configured to transmit an indication of a first set of symbols and a second set of symbols in which a single communication is scheduled; and transmit or receive the single communication in the first set of symbols and the second set of symbols using a first spatial parameter for the first set of symbols and a second spatial parameter for the second set of symbols.

In some aspects, a non-transitory computer-readable medium may store one or more instructions for wireless communication. The one or more instructions, when executed by one or more processors of a base station, may cause the one or more processors to transmit an indication of a first set of symbols and a second set of symbols in which a single communication is scheduled; and transmit or receive the single communication in the first set of symbols and the second set of symbols using a first spatial parameter for the first set of symbols and a second spatial parameter for the second set of symbols.

In some aspects, an apparatus for wireless communication may include means for transmitting an indication of a first set of symbols and a second set of symbols in which a single communication is scheduled; and means for transmitting or receiving the single communication in the first set of symbols and the second set of symbols using a first spatial parameter for the first set of symbols and a second spatial parameter for the second set of symbols.

In some aspects, a method of wireless communication, performed by a user equipment (UE), may include receiving an indication of a first set of symbols and a second set of symbols in which a single communication is scheduled; and transmitting or receiving the single communication in the first set of symbols and the second set of symbols using a first spatial parameter for the first set of symbols and a second spatial parameter for the second set of symbols.

In some aspects, a UE for wireless communication may include memory and one or more processors operatively coupled to the memory. The memory and the one or more processors may be configured to receive an indication of a first set of symbols and a second set of symbols in which a single communication is scheduled; and transmit or receive the single communication in the first set of symbols and the second set of symbols using a first spatial parameter for the first set of symbols and a second spatial parameter for the second set of symbols.

In some aspects, a non-transitory computer-readable medium may store one or more instructions for wireless communication. The one or more instructions, when executed by one or more processors of a UE, may cause the one or more processors to receive an indication of a first set of symbols and a second set of symbols in which a single communication is scheduled; and transmit or receive the single communication in the first set of symbols and the second set of symbols using a first spatial parameter for the first set of symbols and a second spatial parameter for the second set of symbols.

In some aspects, an apparatus for wireless communication may include means for receiving an indication of a first set of symbols and a second set of symbols in which a single communication is scheduled; and means for transmitting or receiving the single communication in the first set of symbols and the second set of symbols using a first spatial parameter for the first set of symbols and a second spatial parameter for the second set of symbols.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
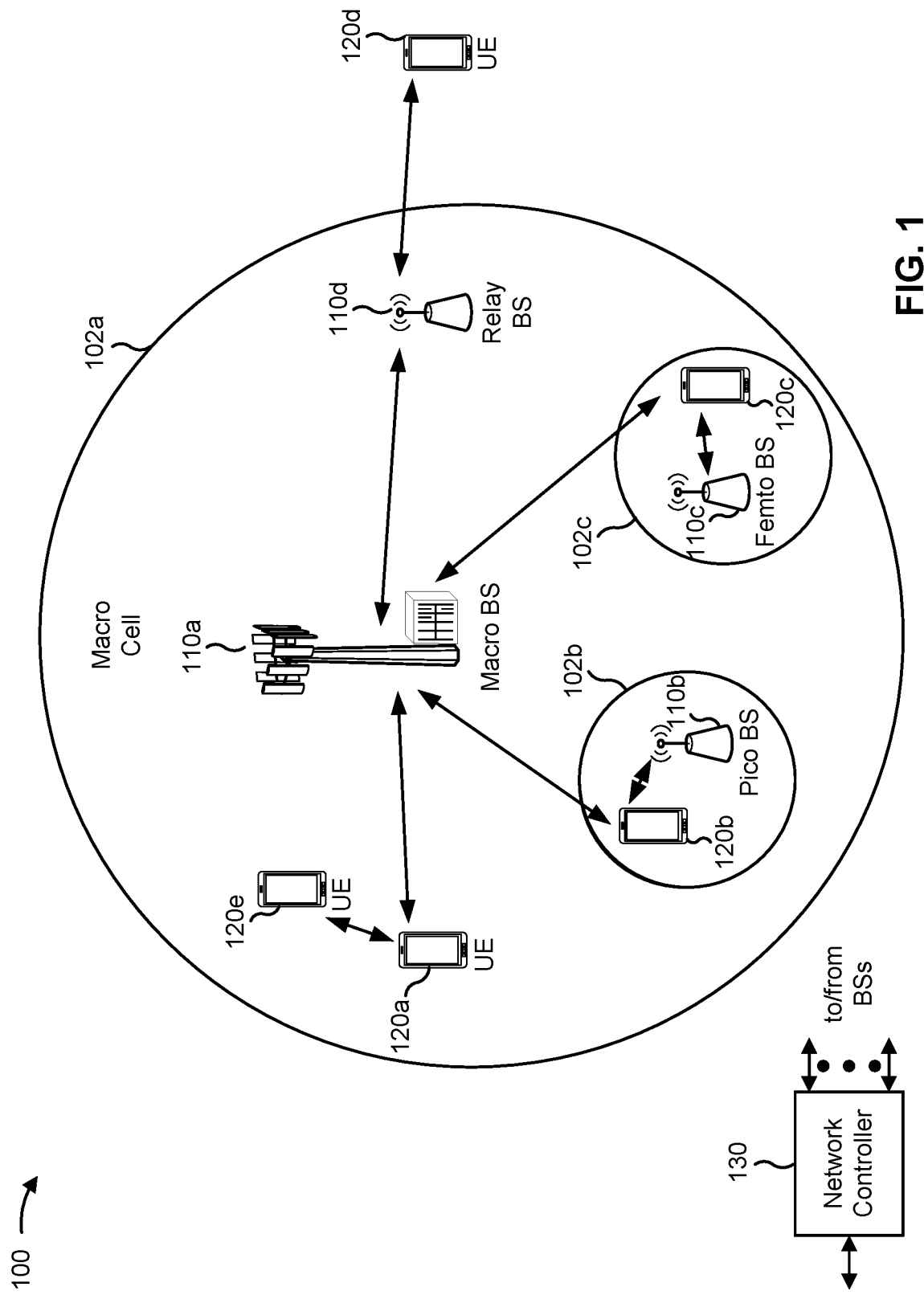
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what was described with regard to FIG. 1.

Figure 2:
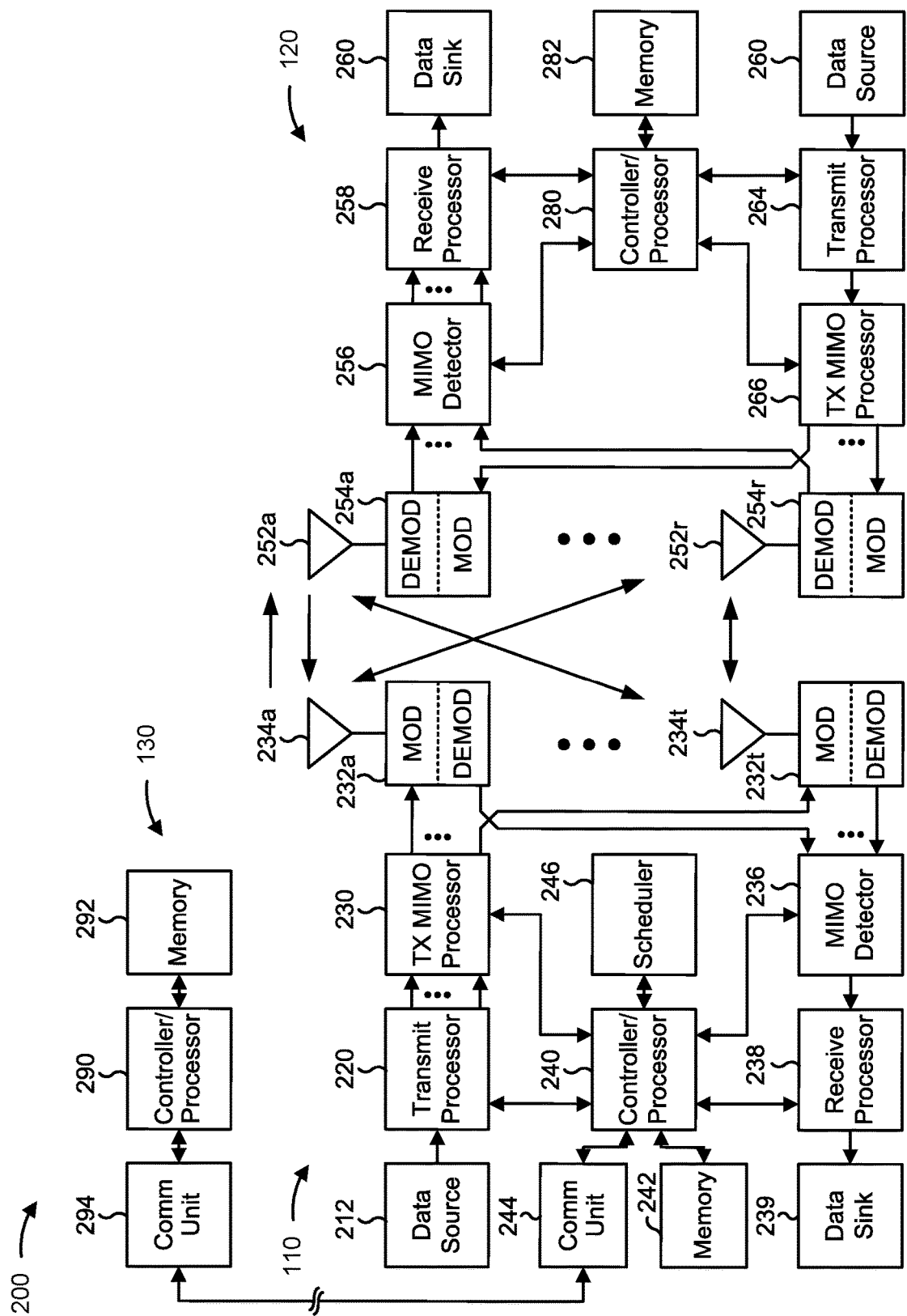
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transport block transmission using different spatial parameters, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. A scheduler 246 may schedule UEs for data transmission on the downlink and/or uplink.

In some aspects, UE 120 and/or base station 110 may include means for determining a first set of parameters associated with a first transport block (TB) repetition of a TB and a second set of parameters associated with a second TB repetition of the TB; means for determining a TB size of the TB based at least in part on the first set of parameters, the second set of parameters, or both the first set of parameters and the second set of parameters; and/or the like. In some aspects, such means may include one or more components of UE 120 and/or base station 110 described in connection with FIG. 2.

In some aspects, UE 120 may include means for receiving a grant for a first TB repetition, wherein the grant indicates a first mini-slot in which the first TB repetition is scheduled; means for determining one or more subsequent mini-slots, that occur after the first mini slot, in which one or more subsequent TB repetitions are scheduled based at least in part on a mini-slot pattern configuration or one or more parameters of the first TB repetition; and/or the like. Additionally, or alternatively, UE 120 may include means for receiving an indication of a first set of symbols and a second set of symbols in which a single communication is scheduled; means for transmitting or receiving the single communication in the first set of symbols and the second set of symbols using a first spatial parameter for the first set of symbols and a second spatial parameter for the second set of symbols; and/or the like. In some aspects, such means may include one or more components of UE 120 described in connection with FIG. 2.

In some aspects, base station 110 may include means for transmitting a grant for a first TB repetition, wherein the grant indicates a first mini-slot in which the first TB repetition is scheduled; means for scheduling one or more subsequent TB repetitions in one or more subsequent mini-slots that occur after the first mini slot, wherein the one or more subsequent mini-slots are determined based at least in part on a mini-slot pattern configuration or one or more parameters of the first TB repetition; and/or the like. Additionally, or alternatively, base station 110 may include means for transmitting an indication of a first set of symbols and a second set of symbols in which a single communication is scheduled; means for transmitting or receiving the single communication in the first set of symbols and the second set of symbols using a first spatial parameter for the first set of symbols and a second spatial parameter for the second set of symbols; and/or the like. In some aspects, such means may include one or more components of base station 110 described in connection with FIG. 2.

As indicated above, FIG. 2 is provided merely as an example. Other examples may differ from what was described with regard to FIG. 2.

Figure 3:
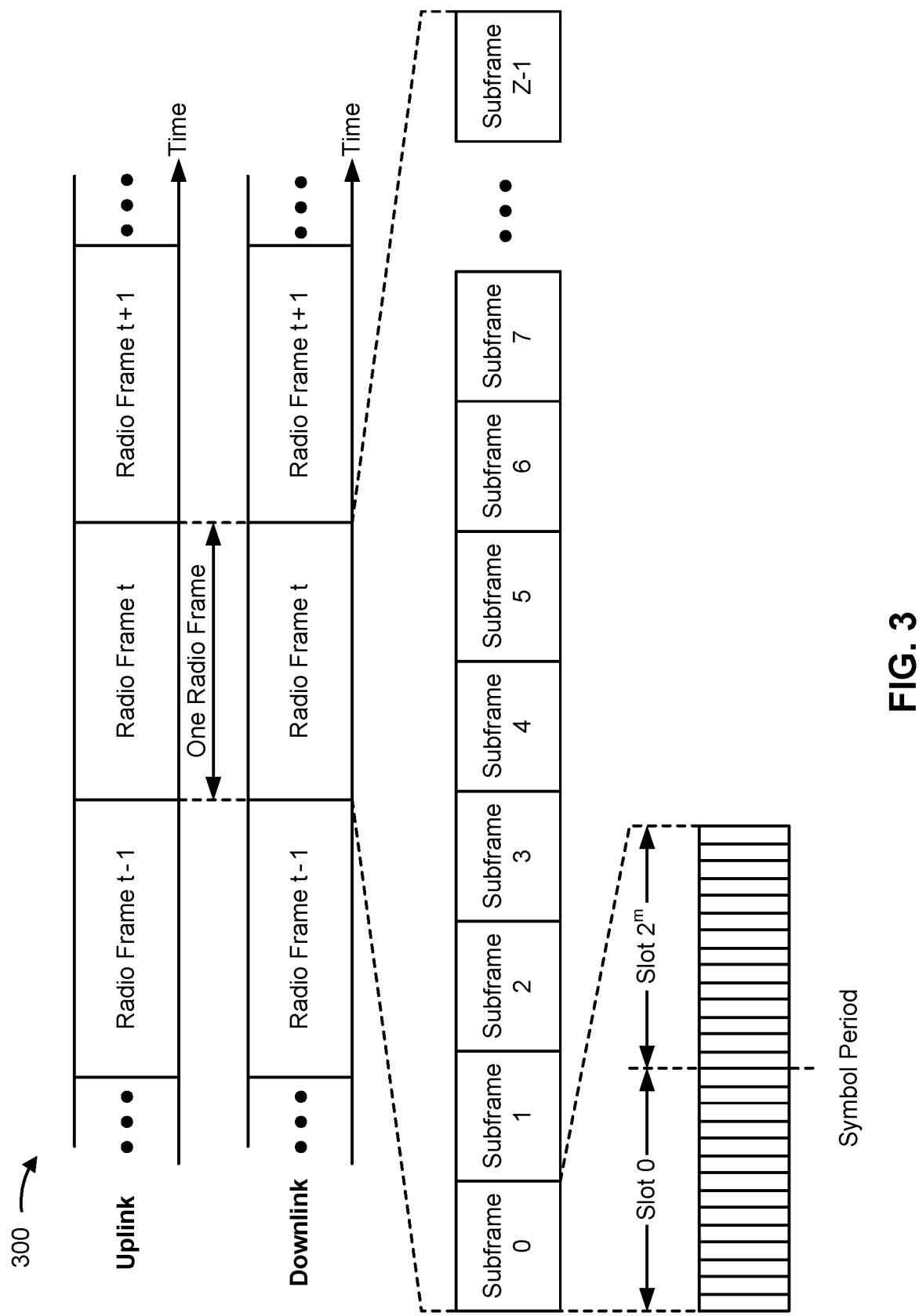
FIG. 3 is a block diagram conceptually illustrating an example of a frame structure in a wireless communication network, in accordance with various aspects of the present disclosure.

FIG. 3 shows an example frame structure 300 in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a slot may include one or more mini-slots. A mini-slot may include a number of symbols (e.g., 2 symbols, 3 symbols, 4 symbols, and/or the like) capable of being scheduled as a unit. In some aspects, a scheduling unit may be frame-based, subframe-based, slot-based, mini-slot based, symbol-based, and/or the like.

In some aspects, transmissions may be repeated in multiple transmission time intervals (TTIs), such as multiple slots, multiple mini-slots, multiple sets of symbols, and/or the like, such as for multi-slot transmission and/or slot aggregation (e.g., on a physical downlink shared channel (PDSCH), a physical uplink shared channel (PUSCH), a physical uplink control channel (PUCCH), and/or the like). In some aspects, one, two, four, or eight repetitions may be used in a time period (P). Additionally, or alternatively, different repetitions may use different redundancy versions of a communication. In some aspects, such repetition schemes may be used to achieve higher reliability and/or lower latency, such as for ultra-reliable low latency communication (URLLC), uplink grant-free communication, and/or the like.

While some techniques are described herein in connection with frames, subframes, slots, min-slots, and/or the like, these techniques may equally apply to other types of wireless communication structures or transmission time intervals (TTIs), which may be referred to using terms other than "frame," "subframe," "slot," "mini-slot," and/or the like in 5G NR. In some aspects, a wireless communication structure or a TTI may refer to a periodic time-bounded communication unit defined by a wireless communication standard and/or protocol. Additionally, or alternatively, different configurations of wireless communication structures and/or TTIs than those shown in FIG. 3 may be used.

As indicated above, FIG. 3 is provided as an example. Other examples may differ from what was described with regard to FIG. 3.

Figure 4:
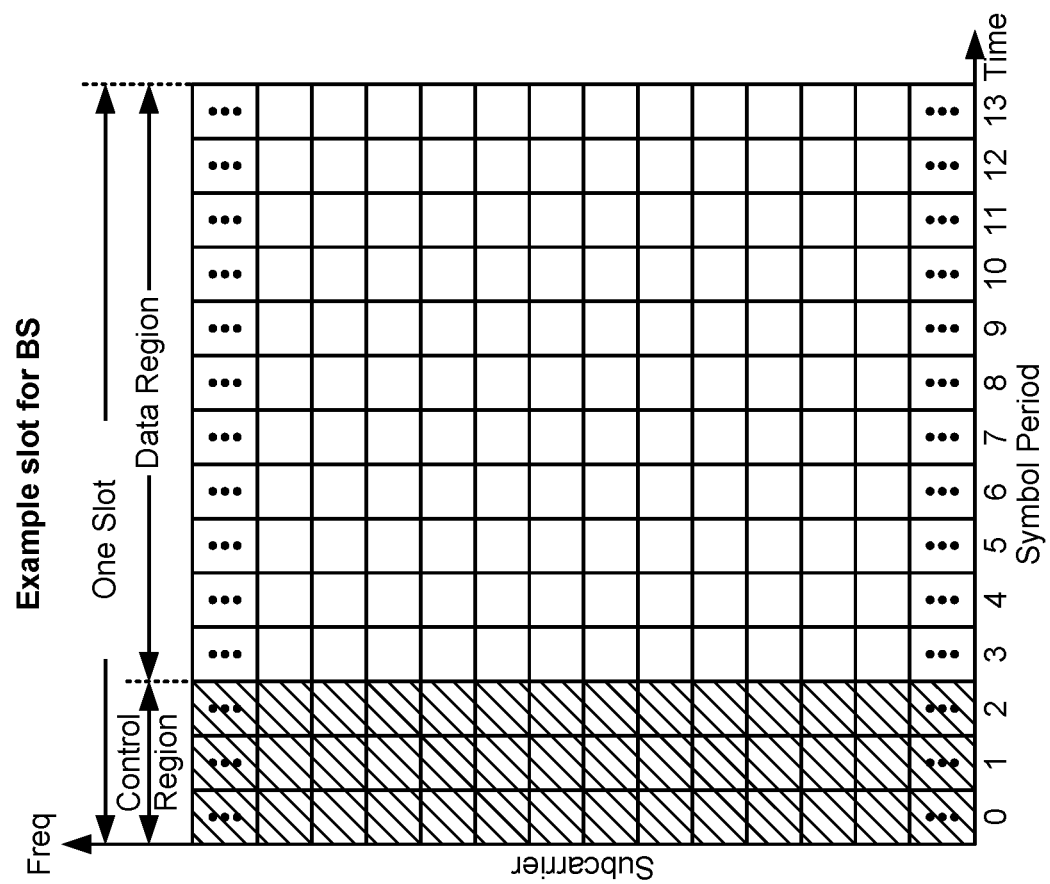
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks (RBs). Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what was described with regard to FIG. 4.

Figure 5:
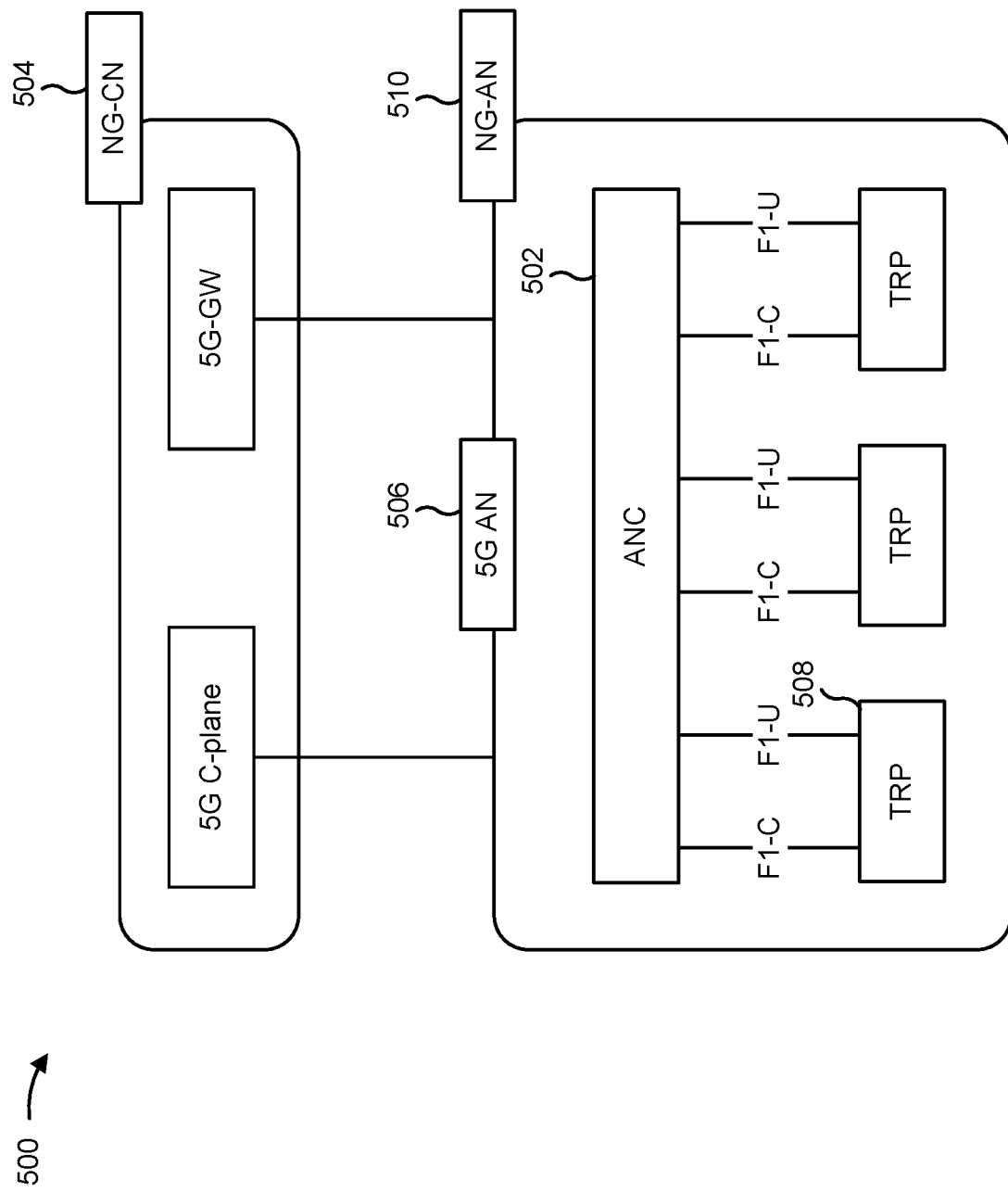
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure.

A 5G access node 506 may include an access node controller (ANC) 502. The ANC 502 may be a central unit (CU) of the distributed RAN 500. The backhaul interface to the next generation core network (NG-CN) 504 may terminate at the ANC 502. The backhaul interface to neighboring next generation access nodes (NG-ANs) may terminate at the ANC 502. The ANC 502 may include one or more TRPs 508 (which may also be referred to as BSs, NR BSs, Node Bs, 5G NBs, APs, gNB, or some other term). As described above, a TRP 508 may be used interchangeably with "cell." In some aspects, multiple TRPs 508 may be included in a single base station 110. Additionally, or alternatively, different TRPs 508 may be included in different base stations 110.

A TRP 508 may be a distributed unit (DU). A TRP 508 may be connected to a single ANC 502 or multiple ANCs 502. For example, for RAN sharing, radio as a service (RaaS), and service specific AND deployments, the TRP 508 may be connected to more than one ANC 502. A TRP 508 may include one or more antenna ports. The TRPs 508 may be configured to individually (e.g., using dynamic selection) or jointly (e.g., using joint transmission) serve traffic to a UE 120.

In some aspects, multiple TRPs 508 may transmit the same communication (e.g., the same transport block, PDSCH communication, and/or the like) in different TTIs (e.g., slots, mini-slots, and/or the like) using different spatial parameters (e.g., different quasi co-location (QCL) parameters, different transmission configuration indicator (TCI) states, different precoding parameters, different beamforming parameters, and/or the like). Additionally, or alternatively, a UE 120 may transmit the same communication (e.g., the same transport block, PUSCH communication, PUCCH communication, and/or the like) in different TTIs using different spatial parameters (e.g., different spatial domain filters, different spatial relations, different precoding parameters, different beamforming parameters, and/or the like), such as when the UE 120 is transmitting to different TRPs 508.

The local architecture of RAN 500 may be used to illustrate fronthaul definition. The architecture may be defined to support fronthauling solutions across different deployment types. For example, the architecture may be based at least in part on transmit network capabilities (e.g., bandwidth, latency, and/or jitter). The architecture may share features and/or components with LTE. According to aspects, the next generation AN (NG-AN) 510 may support dual connectivity with NR. The NG-AN 510 may share a common fronthaul for LTE and NR. The architecture may enable cooperation between and among TRPs 508. For example, cooperation may be preset within a TRP 508 and/or across TRPs 508 via the ANC 502. In some aspects, no inter-TRP interface may be needed/present.

In some aspects, a dynamic configuration of split logical functions may be present within the architecture of RAN 500. The packet data convergence protocol (PDCP), radio link control (RLC), media access control (MAC) protocol, and/or the like may be adaptably placed at the ANC 502 or TRP 508. According to various aspects, a base station 110 may include a central unit (CU) (e.g., ANC 502) and/or one or more distributed units (e.g., one or more TRPs 508).

As indicated above, FIG. 5 is provided merely as an example. Other examples may differ from what was described with regard to FIG. 5.

Figure 6:
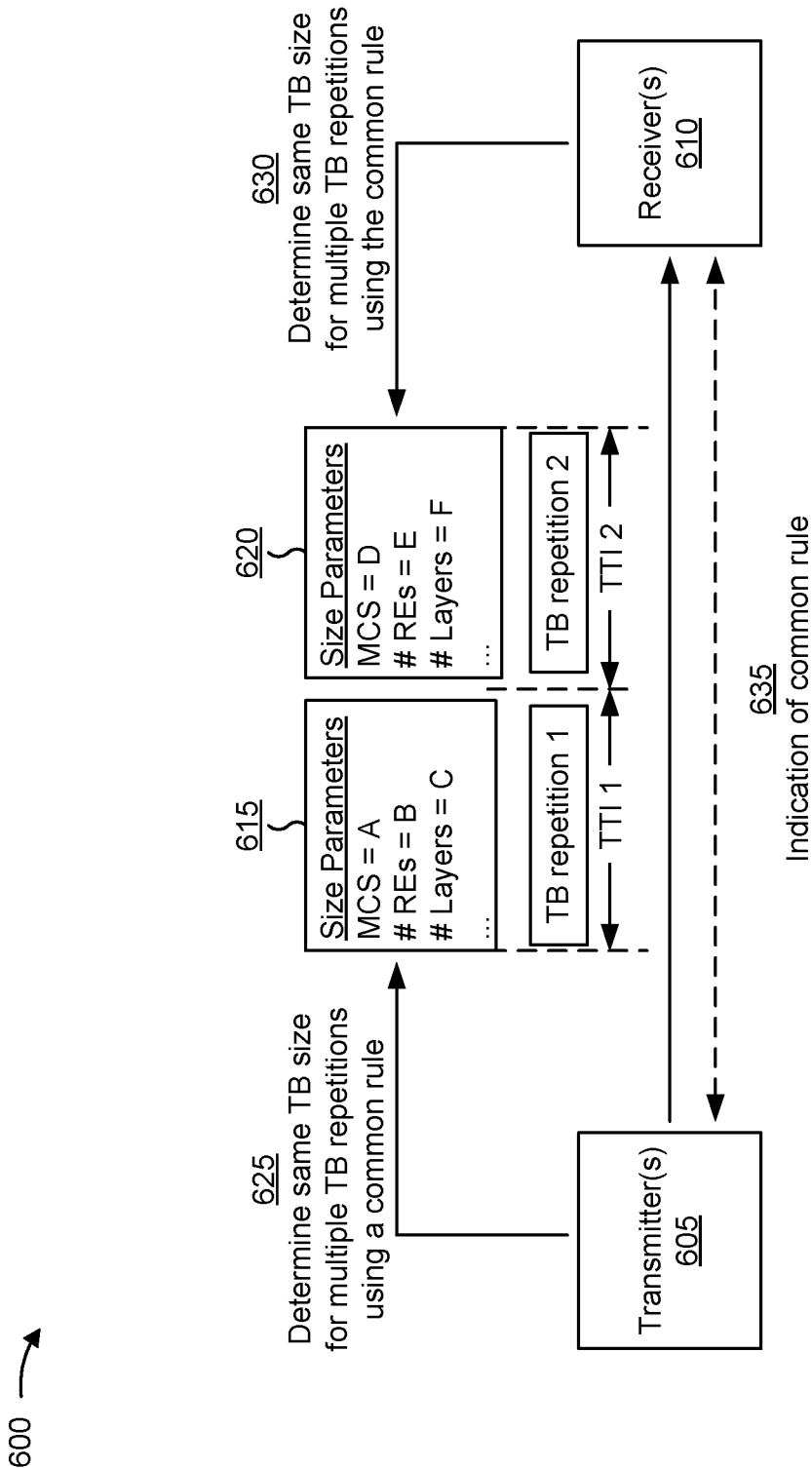
FIGS. 6-8 are diagram illustrating examples of transport block transmission using different spatial parameters, in accordance with various aspects of the present disclosure.

FIG. 6 is a diagram illustrating an example 600 of transport block transmission using different spatial parameters, in accordance with various aspects of the present disclosure.

As shown in FIG. 6, a transmitter 605 and a receiver 610 may communicate with one another in a wireless communication system. The transmitter 605 and/or the receiver 610 may be a wireless communication device, such as a base station 110, a UE 120, and/or the like. In some aspects, the transmitter 605 is a base station 110 and the receiver 610 is a UE 120. In some aspects, the transmitter 605 is a UE 120 and the receiver 610 is a base station 110.

Transport blocks (TBs) transmitted in different TTIs (e.g., slots, mini-slots, sets of symbols, and/or the like) may be associated with different parameters used to determine respective transport block (TB) sizes of those TBs. In some aspects, a parameter used to determine a size of a TB may be referred to as a TB size determination parameter, and may include, for example, a modulation and coding scheme (MCS) used for the TB, a number of resource elements allocated for the TB, a number of layers (e.g., spatial layers) to be used to transmit the TB, and/or the like. When different TBs are transmitted in different TTIs and/or by different base stations 110 and/or TRPs 508 (e.g., in different RBs and/or different spatial layers), those TBs may have different TB sizes if those TBs are associated with different TB size determination parameters.

However, when a TB is repeated in multiple TTIs, in different RBs, and/or in different spatial layers, that TB must have the same size across all repetitions because the same TB is included in each repetition (with potentially different redundancy versions). If a TB size were to be determined independently for each TB repetition, then different TB sizes may be determined for different TB repetitions, which would violate the requirement that the TB in each repetition be the same size. For example, demodulation reference signal (DMRS) sharing may be used across TB repetitions, where only some of the TB repetitions include DMRS to reduce DMRS overhead. In this case, different TB repetitions would include different numbers of symbols (e.g., resource elements), which would lead to different TB sizes.

As another example, in the case where different TB repetitions are transmitted by different TRPs, those TRPs may be permitted to flexibly schedule respective TB repetitions (e.g., using a different number of symbols or different mini-slot sizes), thereby resulting in different numbers of symbols for different TB repetitions, which would lead to different TB sizes. Similarly, different TB repetitions may be scheduled using a different number of symbols and/or different mini-slot sizes to avoid crossing a slot boundary for a particular TB repetition. Furthermore, different TRPs may have different channel conditions in relation to a UE 120 (e.g., particularly when the TRPs are not co-located within the same base station 110), which may lead to different MCS parameters, different numbers of spatial layers, and/or the like being used by the different TRPs for respective TB repetitions, which would lead to different TB sizes.

As indicated above, if a TB size for each TB repetition, of a set of TB repetitions (e.g., an initial TB repetition and one or more other TB repetitions, which may be subsequent to the initial TB repetition or transmitted using a different set of RBs and/or a different set of spatial layers), is determined independently for each TB repetition, then the transmitter 605 and/or the receiver 610 may determine different TB sizes for different TB repetitions, which would prevent the same TB from being repeated. Some techniques and apparatuses described herein permit the transmitter 605 and the receiver 610 to determine TB sizes for TB repetitions such that all TB repetitions have the same size, thereby enabling TB repetitions. Furthermore, the transmitter 605 and the receiver 610 may apply the same technique or rule for TB size determination, thereby reducing ambiguity and resulting in fewer communication errors. Additional details are described below.

As shown by reference number 615, a first TB repetition (shown as TB repetition 1) may be scheduled in a first TTI (e.g., a first slot, a first mini-slot, a first set of symbols, and/or the like), and may be associated with a first set of TB size determination parameters. As shown, the first set of TB size determination parameters may include a first MCS, a first number of resource elements (REs), a first number of layers (e.g., MIMO layers, spatial layers, and/or the like), and/or the like. As used herein, the term "repetition" may refer to a communication that is transmitted more than one time, and includes the initial transmission of that communication as well as each subsequent transmission of that communication. In some aspects, such repetitions may be transmitted without using hybrid automatic repeat request (HARQ) feedback.

As shown by reference number 620, a second TB repetition (shown as TB repetition 2) may be scheduled in a second TTI (e.g., a second slot, a second mini-slot, a second set of symbols, and/or the like), and may be associated with a second set of TB size determination parameters. As shown, the second set of TB size determination parameters may include a second MCS, a second number of REs, a second number of spatial layers, and/or the like. As shown, the first TB repetition and the second TB repetition may be scheduled in, transmitted in, and/or received in different TTIs (e.g., in the case of time-division multiplexing (TDM)). Additionally, or alternatively, the first TB repetition and the second TB repetition may be scheduled in, transmitted in, and/or received in different sets of REs and/or RBs (e.g., in the case of frequency-division multiplexing (FDM)). Additionally, or alternatively, the first TB repetition and the second TB repetition may be scheduled in, transmitted in, and/or received in different spatial layers (e.g., in the case of spatial-division multiplexing (SDM)). In some aspects, the first TB and the second TB may be transmitted in the same TTI but with different parameters, as shown (e.g., different spatial layers, different numbers of REs, different RBs, and/or the like). Although two TB repetitions are shown as an example, a different number of TB repetitions may be used (e.g., four, eight, and/or the like). In some aspects, sets of TB size determination parameters may be indicated in a radio resource control (RRC) message, in downlink control information (DCI), and/or the like.

As shown by reference number 625, the transmitter 605 may determine a TB size for a repeated TB using a rule. Similarly, as shown by reference number 630, the receiver 610 may determine the TB size for the repeated TB using the rule. The rule may be a common rule that is commonly applied by both the transmitter 605 and the receiver 610, thereby reducing ambiguity and reducing communication errors. Application of the rule may result in a determination of a same TB size for multiple TB repetitions, even if those TB repetitions are associated with different TB size determination parameters. In some aspects, the rule may be pre-specified according to a wireless communication standard. Additionally, or alternatively, the rule may be pre-configured according to a configuration message communicated between the transmitter 605 and the receiver 610 (e.g., in an RRC message and/or the like).

In some aspects, the rule may be based at least in part on the first set of TB size determination parameters and/or the second set of TB size determination parameters (and/or or one or more other sets of TB size determination parameters for one or more other TB repetitions). In this case, the transmitter 605 and the receiver 610 may determine the TB size for the multiple TB repetitions based at least in part on one or more sets of TB size determination parameters of multiple sets of TB size determination parameters corresponding to the multiple TB repetitions.

In some aspects, only the first set of TB size determination parameters, associated with the first TB repetition (e.g., an initial TB repetition), may be used to determine the TB size. For example, a pre-specified and/or pre-configured rule may indicate that the TB size for all TB repetitions is to be determined using TB size determination parameters of only the initial TB repetition. This may conserve resources (e.g., processing resources, memory resources, and/or the like) by reducing or eliminating calculations using other sets of TB size determination parameters.

In some aspects, the TB size may be determined based at least in part on a function of a first TB size determined using the first set of TB size determination parameters and a second TB size determined using the second set of TB size determination parameters (and or one or more other TB sizes determined using one or more other sets of TB size determination parameters associated with one or more other TB repetitions). For example, TB sizes may be calculated for each TB repetition (e.g., using corresponding TB size determination parameters), and a function may be applied to those calculated TB sizes to determine a common TB size to be used for all TB repetitions. The function may include, for example, a minimum TB size of the calculated TB sizes, a maximum TB size of the calculated TB sizes, an average TB size of the TB sizes, and/or the like. In this way, the TB repetitions may be flexibly configured to account for different scenarios, such as different network conditions (e.g., traffic load and/or the like), different channel conditions, and/or the like.

In some aspects, the TB size may be determined using only a single set of TB size determination parameters corresponding to a specific TB repetition. In some aspects, a base station 110 may indicate the specific TB repetition to a UE 120 (e.g., in DCI, in an RRC message, and/or the like). Additionally, or alternatively, the specific TB repetition may be a TB repetition associated with a specific spatial parameter (e.g., QCL parameter, TCI state, spatial domain filter, and/or the like). The specific spatial parameter may be a spatial parameter that satisfies a condition, such as a spatial parameter with the lowest value among all spatial parameters for all TB repetitions, a spatial parameter with the highest value among all spatial parameters for all TB repetitions, a spatial parameter that matches a default value, and/or the like. In some aspects, the specific spatial parameter may be pre-specified in a wireless communication standard, may be pre-configured in a configuration message, may be communicated between the transmitter 605 and the receiver 610, and/or the like.

In some aspects, the TB size may be determined based at least in part on a joint determination that is a function of the first set of TB size determination parameters and the second set of TB size determination parameters (and one or more other sets of TB size determination parameters associated with one or more other TB repetitions). In this case, the TB size may be determined as a function of all of the TB size determination parameters of all TB repetitions, without first calculating individual TB sizes for each TB repetition.

As shown by reference number 635, the transmitter 605 or the receiver 610 may transmit, to the other of the transmitter 650 or the receiver 610, the rule to be applied to determine the TB size for the multiple TB repetitions. For example, a base station 110 may transmit, and a UE 120 may receive, an indication of the rule. As indicated above, in some aspects, the indication may identify a specific TB repetition, and the set of TB size determination parameters corresponding to that TB repetition may be used to determine the TB size for all TB repetitions. Alternatively, one or more other rules may be indicated, as described above. In some aspects, the rule may be indicated in an RRC message (e.g., an RRC configuration message, an RRC reconfiguration message, and/or the like), in DCI, and/or the like.

In some aspects, when the transmitter 605 is a UE 120, the TB repetitions may be scheduled and/or transmitted in the PUSCH. In some aspects, when the transmitter 605 is a base station 110, the TB repetitions may be scheduled and/or transmitted n the PDSCH. In some aspects, different base stations 110 and/or TRPs 508 may schedule and/or transmit different TB repetitions. In all of these cases, the UE 120 and the base station 110 (and/or the TRPs 508) may both apply the same rule when determining a TB size for TB repetitions, thereby enabling TB repetition that uses the same TB size across all repetitions, reducing ambiguity, and reducing communication errors.

As indicated above, FIG. 6 is provided as an example. Other examples may differ from what was described with respect to FIG. 6.

Figure 7:
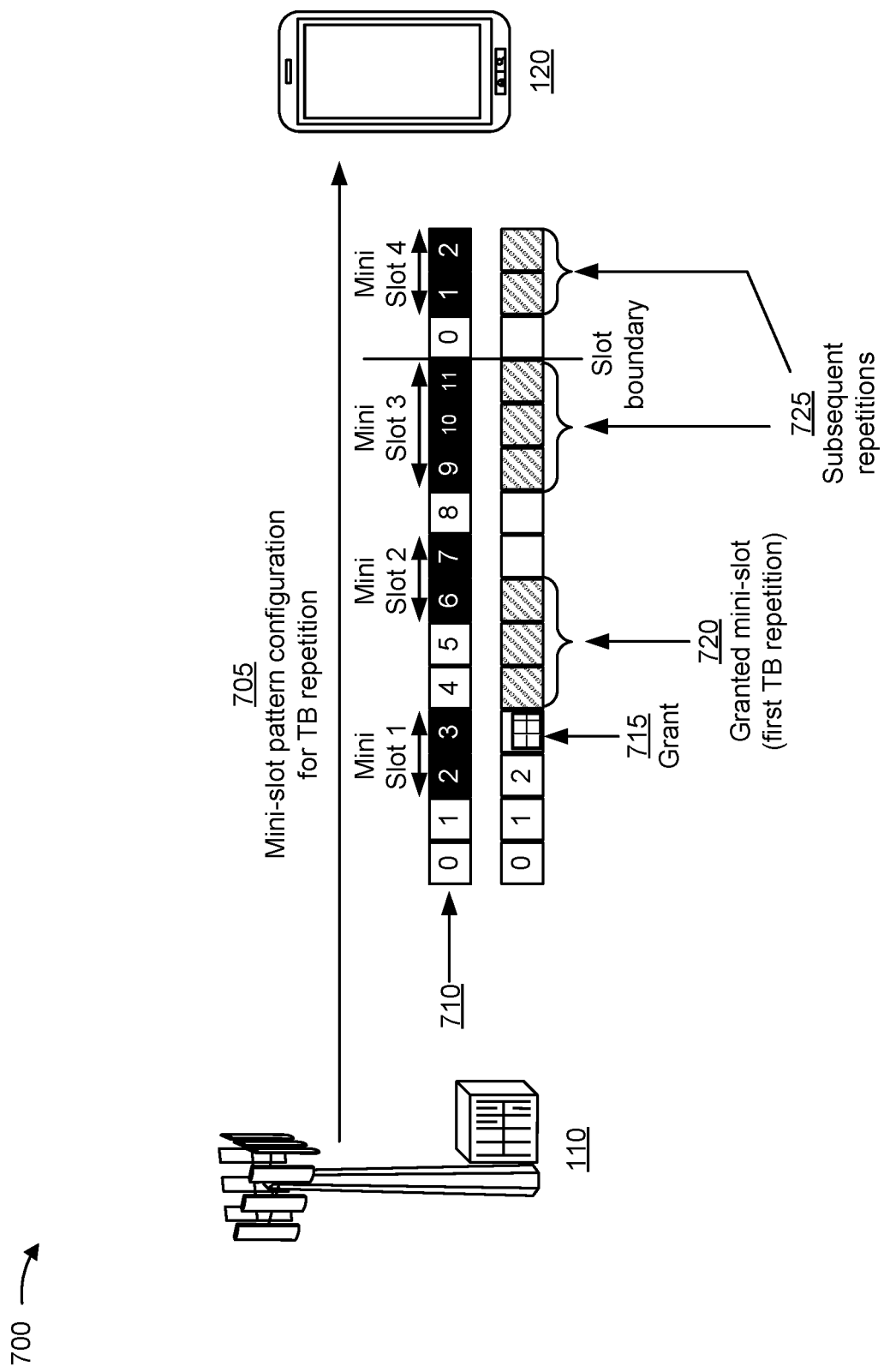

FIG. 7 is a diagram illustrating another example 700 of transport block transmission using different spatial parameters, in accordance with various aspects of the present disclosure.

As described above, a TB may be repeated in multiple mini-slots. However, this may consume additional control resources (e.g., on a physical downlink control channel (PDCCH)) if a grant were to be transmitted for each TB repetition (e.g., with control information for the TB repetition, such as a resource allocation and/or other TB parameters). Some techniques and apparatuses described herein permit a single grant (e.g., a downlink grant) to be used to schedule multiple TB repetitions, thereby conserving network resources and device resources (e.g., processing resources, memory resources, battery power, and/or the like) that would otherwise be consumed to transmit and/or process multiple grants corresponding to the multiple TB repetitions. In some aspects, additional resources may be conserved by using control information for a single TB repetition (e.g., the first or initial TB repetition) to determine control information for other (e.g., subsequent) TB repetitions (e.g., according to a configuration, which may be transmitted once, in an RRC message, instead of multiple times in DCI). Additional details are described below.

As shown by reference number 705, a base station 110 may transmit, and a UE 120 may receive, a mini-slot pattern configuration to be used for TB repetition. The mini-slot pattern configuration may indicate a pattern of mini-slots (e.g., in a time domain) for a time period. In some aspects, the time period may be indicated in the mini-slot pattern configuration. Additionally, or alternatively, the time period may be pre-specified according to a wireless communication standard. The time period may include, for example, a number of slots (e.g., 1 slot, 2 slots, 3 slots, and/or the like), a number of symbols (e.g., 12 symbols, 14 symbols, 24 symbols, 28 symbols, 36 symbols, 42 symbols, and/or the like), and/or the like. In some aspects, the time period may depend on whether slots are configured with a normal cyclic prefix (e.g., with 14 symbols) or an extended cyclic prefix (e.g., with 12 symbols). In some aspects, the mini-slot pattern configuration may be indicated in an RRC message.

A mini-slot pattern configuration may indicate a number of mini-slots included in the time period and the symbols occupied by each of the mini-slots. In some aspects, the mini-slot pattern configuration may indicate the set of symbols occupied by a mini-slot by indicating a starting symbol and an ending symbol of the mini-slot. Additionally, or alternatively, the mini-slot pattern configuration may indicate the set of symbols occupied by a mini-slot by indicating a starting symbol and a duration (e.g., a length, a number of symbols, and/or the like) of the mini-slot. In some aspects, the mini-slot pattern may be configured such that none of the individual mini-slots, indicated in the mini-slot pattern, cross a slot boundary, thereby reducing complexity (e.g., since processing by the UE 120 and/or the base station 110 may be slot-based). In other words, each mini-slot, included in the mini-slot pattern, may be self-contained within a single slot.

For example, as shown by reference number 710, a mini-slot pattern configuration may be indicated for a time period of two slots, where each slot includes 12 symbols (e.g., with an extended cyclic prefix). The mini-slot pattern configuration may indicate that a first mini-slot (shown as Mini slot 1) occupies symbols 2 and 3 of the first slot, that a second mini-slot (shown as Mini slot 2) occupies symbols 6 and 7 of the first slot, that a third mini-slot (shown as Mini slot 3) occupies symbols 9, 10, and 11 of the first slot, that a fourth mini-slot (shown as Mini slot 4) occupies symbols 1 and 2 of the second slot, and so on. Thus, as shown, different mini-slots in the mini-slot pattern configuration may be configured with different lengths (e.g., 2 symbols, 3 symbols, 4 symbols, and/or the like). Alternatively, in some aspects, all of the mini-slots of a specific mini-slot pattern may have the same length.

As shown by reference number 715, the base station 110 may transmit, and the UE 120 may receive, a grant (e.g., DCI) for a first TB repetition (e.g., an initial TB repetition). The grant may indicate a first mini-slot (e.g., a first set of symbols) in which the first TB repetition is scheduled. In example 700, the grant is scheduled, transmitted, and received in symbol 3 of the first slot (e.g., in the PDCCH), and indicates that the first TB repetition occurs in symbols 4, 5, and 6 of the first slot (e.g., in the PDSCH or the PUSCH), as shown by reference number 720. As shown, the mini-slot in which the first TB repetition is scheduled, transmitted, and/or received does not need to be included in the mini-slot pattern indicated by the mini-slot pattern configuration. However, in some aspects, the mini-slot in which the first TB repetition is scheduled, transmitted, and/or received may be included in the mini-slot pattern.

As shown by reference number 725, one or more subsequent TB repetitions, that occur after the first TB repetition, may be scheduled, transmitted, and/or received based at least in part on the mini-slot pattern configuration. For example, one or more subsequent mini-slots, corresponding to the one or more subsequent TB repetitions, may occur after the first mini-slot in which the first TB repetition is scheduled. In some aspects, the number of subsequent mini-slots may be determined based at least in part on a number of TB repetitions (e.g., an aggregation level, which may be indicated in the grant), and the symbols occupied by those TB repetitions may be determined based at least in part on the mini-slot pattern. In some aspects, the mini-slot(s) for the subsequent TB repetition(s) may have a starting symbol that occurs after an ending symbol of the first mini-slot in which the first TB repetition is scheduled.

For example, in example 700, the first TB repetition is scheduled in a first mini-slot that ends in symbol 6 of the first slot. In this case, Mini slot 1 and Mini slot 2 cannot be subsequent mini-slots because Mini slot 1 occurs entirely before the first TB repetition and Mini slot 2 overlaps with the first TB repetition. In other words, Mini slot 1 and Mini slot 2 do not start after an ending symbol of the first TB repetition (e.g., symbol 6 of the first slot). However, Mini slot 3 and Mini slot 4 can be subsequent mini-slots because both Mini slot 3 and Mini slot 4 start after the end of the first TB repetition. In this case, if the number of repetitions is two, then the TB would be repeated in the scheduled mini-slot (e.g., symbols 4, 5, and 6 of the first slot) and Mini slot 3 (e.g., symbols 9, 10, and 11 of the first slot). If the number of repetitions is greater than two, then the TB would be repeated in the scheduled mini-slot (e.g., symbols 4, 5, and 6 of the first slot), Mini slot 3 (e.g., symbols 9, 10, and 11 of the first slot), Mini slot 4 (e.g., symbols 1 and 2 of the second slot), and potentially one or more other mini-slots include in the mini-slot pattern, depending on the number of repetitions.

Additionally, or alternatively, the one or more subsequent TB repetitions, that occur after the first TB repetition, may be scheduled, transmitted, and/or received based at least in part on one or more parameters of the first TB repetition, such as a starting symbol of the first TB repetition, a length of the first TB repetition, an ending symbol of the first TB repetition, a time domain resource allocation of the first TB repetition, and/or the like. For example, the grant for the first TB repetition may schedule multiple (e.g., two, three, or more) contiguous TB repetitions. In some aspects, the grant may indicate a length of the first TB repetition and a starting symbol for the first TB repetition. In this case, the UE 120 may infer the starting symbol of the second TB repetition using the length of the first repetition and the starting symbol of the first TB repetition. For example, starting symbol of the first repetition plus the length of the first TB repetition may indicate the end of the first TB repetition. The UE 120 may determine that the second TB repetition occurs in a next consecutive symbol after the end of the first TB repetition.

In some aspects, one or more parameters (e.g., sometimes referred to herein as TB parameters) for the first TB repetition may be used for one or more subsequent TB repetitions. This may conserve network resources and control information overhead by reusing a set of TB parameters, indicated in the grant, for multiple TB repetitions. For example, a TB parameter may include an MCS, a frequency domain allocation (e.g., frequency resources in which the TB repetitions are scheduled), and/or the like, which may be indicated once (e.g., in the grant) and used for multiple TB repetitions.

In some aspects, some parameters may differ between the first TB repetition and one of more subsequent TB repetitions, such as a spatial parameter (e.g., a TCI state, a QCL parameter, a spatial domain filter, and/or the like), a redundancy version, and/or the like. In this case, the parameters that differ across TB repetitions may be indicated in the grant, in an RRC message, and/or the like. In some aspects, if a parameter is not indicated for a subsequent TB repetition (e.g., in the grant, in DCI, in an RRC message, and/or the like), then the UE 120 may determine that the parameter is the same for the first TB repetition and the subsequent TB repetition.

In some aspects, the grant may indicate a redundancy version (RV) for a TB repetition other than the first TB repetition. For example, the grant may explicitly indicate the redundancy version using a redundancy version identifier. Alternatively, the grant may indicate a redundancy version offset. In this case, the UE 120 may determine a redundancy version for a subsequent TB repetition (e.g., a second TB repetition) by applying the redundancy version offset to a redundancy version of a prior TB repetition (e.g., the first TB repetition). In some aspects, the redundancy version offset may wrap around (e.g., from RV0, RV1, RV2, RV3, back to RV0 in the case of four redundancy versions). In some aspects, the RV offset may be indicated in an RRC message.

In some aspects, DCI may indicate whether to operate in a single TRP transmission mode or a multi-TRP transmission mode, to permit dynamic switching between these modes. For example, an index value in a field of DCI (e.g., a TCI index value in a TCI field) may be used in association with a table stored in memory. The table may indicate a number of TRPs (e.g., a number of spatial parameters) and the spatial parameter value(s) to be used for those TRPs. In some aspects, only the index value (e.g., the TCI index value) may be used to determine the number of TRPs and the spatial parameter(s) for those TRP(s). For example, the index value may point to an entry (e.g., a row) of the table, and that entry may indicate the number of TRPs and the spatial parameter(s) for those TRPs.

Alternatively, the index value and a number of TB repetitions (e.g., an aggregation level, which may be indicated in DCI) may be used to determine the number of TRPs and the spatial parameter(s) for those TRP(s). For example, different entries (e.g., rows) in the table may indicate different numbers of TRPs (e.g., a single TRP, two TRPs, three TRPs, and/or the like) and corresponding spatial parameter (s) (e.g., QCL parameter(s), TCI state(s), and/or the like) for those TRP(s). In some aspects, a length of the entry or row (e.g., a number of values in the entry or row) may indicate the number of TRPs, and different entries (e.g., rows) may have different lengths. In some aspects, a first length (e.g., length 1) may indicate a single TRP transmission mode, and a second length (e.g., greater than 1) may indicate a multi-TRP transmission mode. Additionally, or alternatively, the length may indicate the number of TRPs in the multi-TRP transmission mode (e.g., two TRPs, three TRPs, and/or the like).

In some aspects, the number of TB repetitions may be used to identify multiple entries (e.g., rows) in the table (e.g., entries having the same length, corresponding to the number of TB repetitions), and the TCI index value may be used to identify a specific entry of those multiple entries. For example, different entries of the same length, corresponding to the same number of TRPs, may include different spatial parameter values for those TRPs. Thus, the number of TB repetitions may be used to determine multiple entries corresponding to a number of TRPs indicated by the number of TB repetitions, and the TCI index value may be used to identify specific spatial parameter values to be used for those TRPs.

In some aspects, a TB size may be determined based at least in part on the first TB repetition (e.g., using a set of TB size determination parameters associated with the first TB repetition), and that TB size may be used for all TB repetitions. In this way, TB repetitions of TBs having the same size may be enabled, regardless of whether different TB repetitions are associated with different sets of TB size determination parameters.

In some aspects, if the grant is a downlink grant, then the base station 110 may transmit, and the UE 120 may receive, the first TB repetition in the first min-slot and the one or more subsequent TB repetitions in the one or more subsequent mini-slots. In some aspects, different base stations 110 and/or TRPs 508 may schedule and/or transmit different TB repetitions. In some aspects, if the grant is an uplink grant, then the UE 120 may transmit, and the base station 110 may receive, the first TB repetition in the first min-slot and the one or more subsequent TB repetitions in the one or more subsequent mini-slots.

By using a single grant to indicate locations of multiple TB repetitions, network resources may be conserved that would otherwise be used to transmit multiple grants for the multiple TB repetitions. Furthermore, base station resources and UE resources (e.g., processing resources, memory resources, battery power, and/or the like) may be conserved that would otherwise be consumed to transmit, receive, and/or process multiple grants. Furthermore, by reusing one or more indicated parameters for multiple TB repetitions, additional network resources, base station resources, and UE resources may be conserved.

As indicated above, FIG. 7 is provided as an example. Other examples may differ from what was described with respect to FIG. 7.

Figure 8:
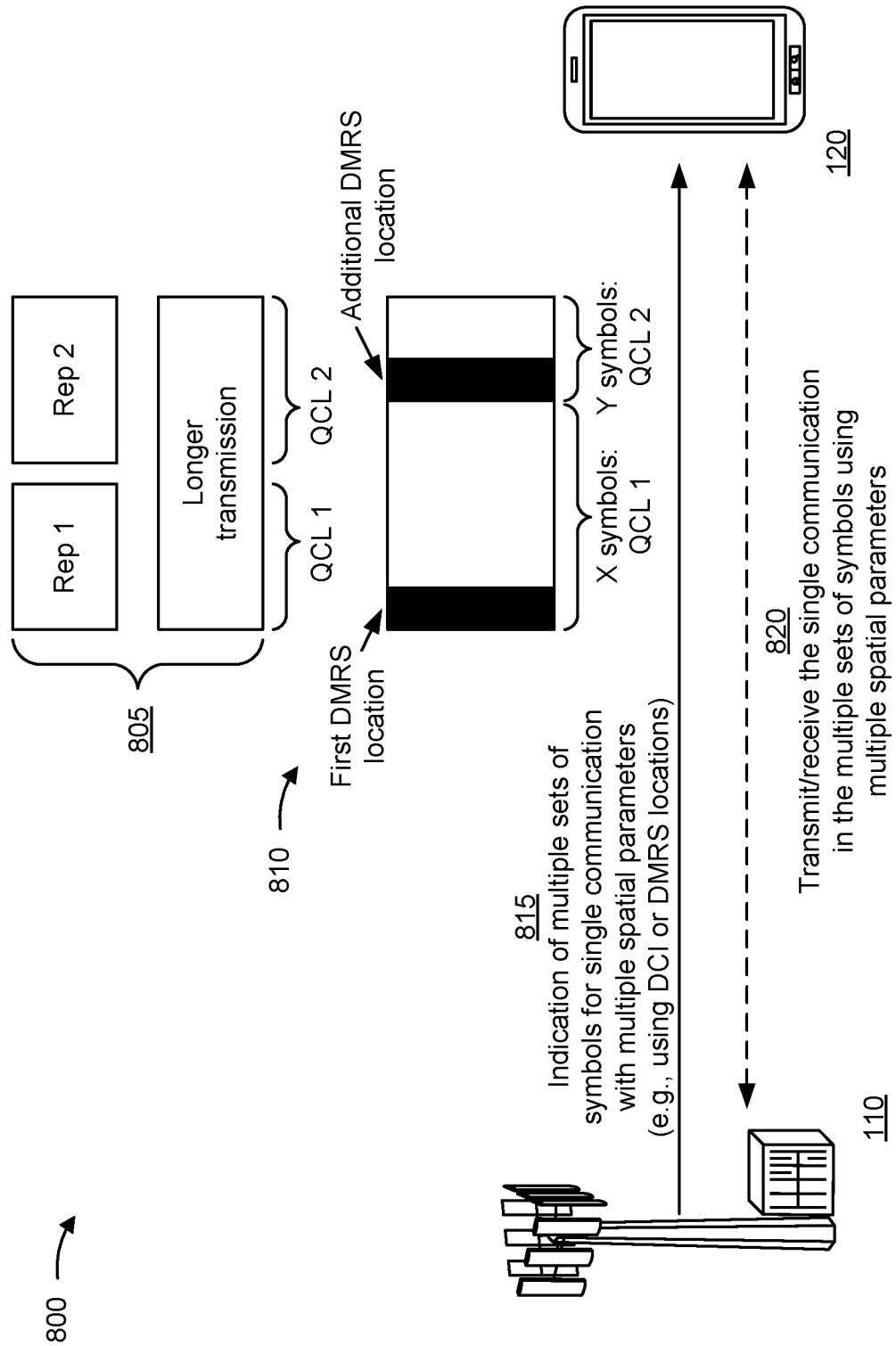

FIG. 8 is a diagram illustrating another example 800 of transport block transmission using different spatial parameters, in accordance with various aspects of the present disclosure.

As shown by reference number 805, rather than transmitting multiple TB repetitions (shown as "Rep 1" and "Rep 2"), a single communication (shown as "Longer Transmission") may be transmitted that has a longer duration than the individual TB repetitions. The single communication may have a smaller code rate (e.g., using a different MCS) than the TB repetitions would use, thereby making the single communication more reliable than either of the individual TB repetitions. In this case, because a single communication (e.g., a single TB) is used, there is no ambiguity when determining TB size. In some aspects, the single communication is a single codeword associated with a single redundancy version.

As shown by reference number 810, the single communication may be transmitted or received in a first set of symbols using a first spatial parameter, and may be transmitted or received in a second set of symbols using a second spatial parameter. In some aspects, the number of symbols included in the first set of symbols (shown as X symbols) may be different from the number of symbols included in the second set of symbols (shown as Y symbols). In some aspects, the same number of symbols may be included in the first set of symbols and the second set of symbols. As described elsewhere herein, a spatial parameter may include a QCL parameter, a TCI state, a precoding parameter, a beamforming parameter, a spatial domain filter, a spatial relation, and/or the like. In example 800, the first spatial parameter is shown as QCL 1 and the second spatial parameter is shown as QCL 2. As further shown in FIG. 8, in some aspects, the first set of symbols and the second set of symbols may be contiguous. However, in some aspects, the first set of symbols and the second set of symbols may be non-contiguous.

As shown by reference number 815, a base station 110 (e.g., which may include one or more TRPs 508) may transmit, and a UE 120 may receive, an indication of the first set of symbols and the second set of symbols in which the single communication (e.g., a single TB) is scheduled. As indicated above, the first set of symbols may be associated with a first spatial parameter, and the second set of symbols may be associated with a second, different spatial parameter.

In some aspects, the first set of symbols and the second set of symbols may be indicated using a first DMRS location and a second DMRS location. For example, a first symbol of the first DMRS (e.g., a symbol in which the first DMRS occurs) may indicate the starting symbol of the first set of symbols (e.g., the same symbol or an immediate next symbol), and a second symbol of the second DMRS (e.g., a symbol in which the second DMRS occurs) may indicate the starting symbol of the second set of symbols (e.g., the same symbol or an immediate next symbol). In this case, the indication may be implied using the first DMRS and the second DMRS. In some aspects, the DMRS locations may be indicated by the base station 110 to the UE 120, such as in an RRC message, in DCI, and/or the like. In some aspects, the second DMRS may be additional DMRS used in addition to the first DMRS for more accurate channel estimation.

In some aspects, the first set of symbols and the second set of symbols may be indicated in DCI. For example, the first set of symbols and/or the second set of symbols may be implicitly indicated in DCI (e.g., according to DMRS locations, as described above). Additionally, or alternatively, the first set of symbols and/or the second set of symbols may be explicitly indicated in DCI, such as in a DCI field reserved for explicit indication of the first set of symbols and/or the second set of symbols. Additionally, or alternatively, the first spatial parameter and/or the second spatial parameter may be indicated in DCI.

As shown by reference number 820, if the single communication is a downlink communication, then the base station 110 may transmit the single communication in multiple sets of symbols (e.g., the first set of symbols, the second set of symbols, and/or the like) using multiple spatial parameters (e.g., the first spatial parameter, the second spatial parameter, and/or the like). In this case, the UE 120 may receive the single communication in the multiple sets of symbols using the multiple spatial parameters. Alternatively, if the single communication is an uplink communication, then the UE 120 may transmit the single communication in multiple sets of symbols (e.g., the first set of symbols, the second set of symbols, and/or the like) using multiple spatial parameters (e.g., the first spatial parameter, the second spatial parameter, and/or the like). In this case, the base station 110 may receive the single communication in the multiple sets of symbols using the multiple spatial parameters.

Although operations are described herein as being performed by a base station 110, in some aspects, one or more of these operations may be performed by multiple base stations 110, multiple TRPs 508 that are included in the same base station 110, multiple TRPs 508 that are included in different base stations 110, and/or the like. For example, a first TRP 508 may transmit and/or receive in the first set of symbols, and a second TRP 508 may transmit and/or receive in the second set of symbols.

By using a single communication (e.g., a single TB) with a longer duration and smaller code rate than individual TB repetitions that could otherwise be used, reliability may be improved without creating ambiguity and additional complexity and processing in connection with determining a TB size for multiple TB repetitions.

As indicated above, FIG. 8 is provided as an example. Other examples may differ from what was described with respect to FIG. 8.

Figure 9:
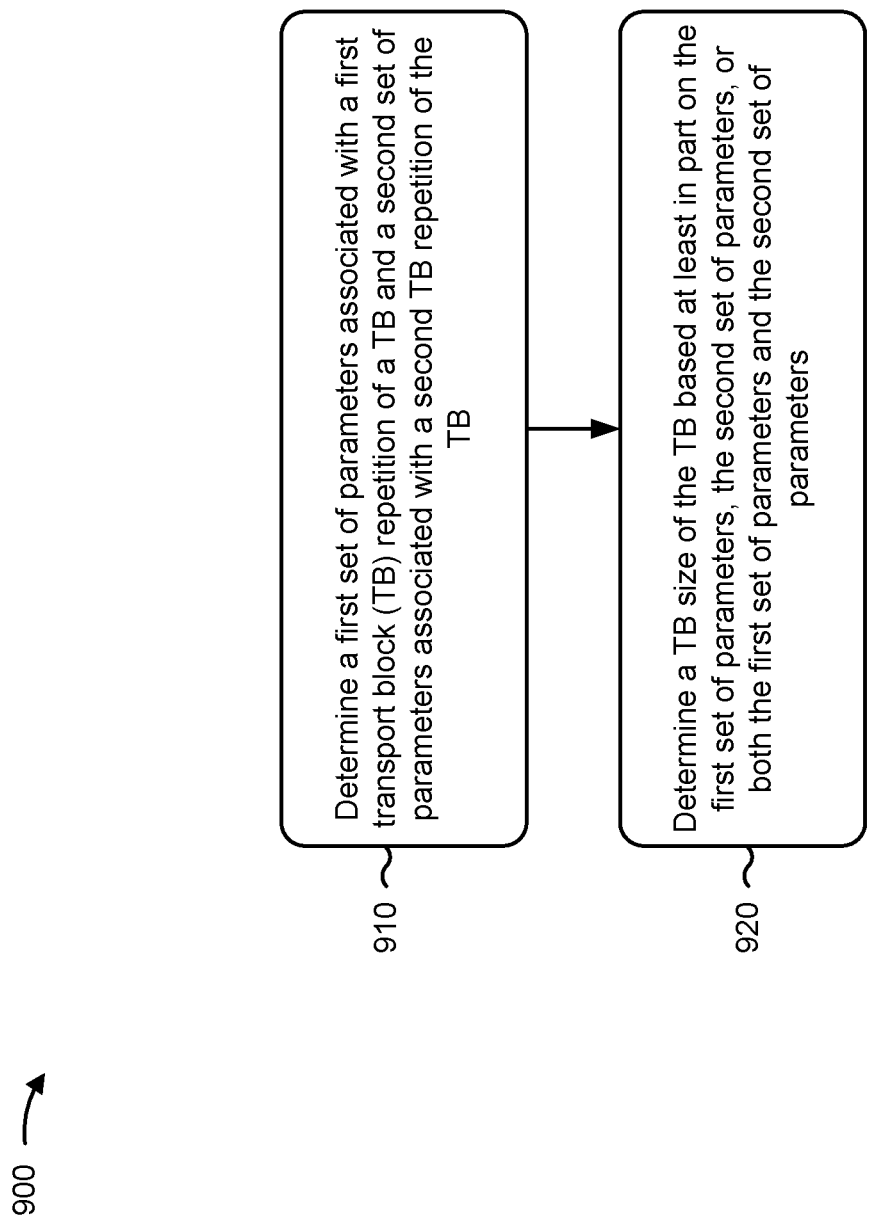
FIGS. 9-13 are diagrams illustrating example processes relating to transport block transmission using different spatial parameters, in accordance with various aspects of the present disclosure.

FIG. 9 is a diagram illustrating an example process 900 performed, for example, by a wireless communication device, in accordance with various aspects of the present disclosure. Example process 900 is an example where a wireless communication device (e.g., base station 110, UE 120, TRP 508, transmitter 605, receiver 610, and/or the like) performs operations associated with transport block transmission using different spatial parameters.

As shown in FIG. 9, in some aspects, process 900 may include determining a first set of parameters associated with a first transport block (TB) repetition of a TB and a second set of parameters associated with a second TB repetition of the TB (block 910). For example, the wireless communication device (e.g., using controller/processor 240, controller/processor 280, and/or the like) may determine a first set of parameters associated with a first TB repetition of a TB and a second set of parameters associated with a second TB repetition of the TB, as described above.

As shown in FIG. 9, in some aspects, process 900 may include determining a TB size of the TB based at least in part on the first set of parameters, the second set of parameters, or both the first set of parameters and the second set of parameters (block 920). For example, the wireless communication device (e.g., using controller/processor 240, controller/processor 280, and/or the like) may determine a TB size of the TB based at least in part on the first set of parameters, the second set of parameters, or both the first set of parameters and the second set of parameters, as described above.

Process 900 may include additional aspects, such as any single aspect or any combination of aspects described below and/or in connection with one or more other processes described elsewhere herein.

In a first aspect, downlink control information indicates whether to use the first set of parameters, the second set of parameters, or both the first set of parameters and the second set of parameters to determine the TB size.

In a second aspect, alone or in combination with the first aspect, only the first set of parameters, and not the second set of parameters, is used to determine the TB size.

In a third aspect, alone or in combination with one or more of the first and second aspects, the TB size is determined based at least in part on a function of a first TB size determined using the first set of parameters and a second TB size determined using the second set of parameters.

In a fourth aspect, alone or in combination with one or more of the first through third aspects, the function includes: a minimum TB size of the first TB size and the second TB size, a maximum TB size of the first TB size and the second TB size, or an average TB size of the first TB size and the second TB size.

In a fifth aspect, alone or in combination with one or more of the first through fourth aspects, the TB size is determined based at least in part on a single set of parameters, of the first set of parameters or the second set of parameters, corresponding to a single TB repetition, of the first TB repetition or the second TB repetition, associated with a pre-configured, pre-specified, or default spatial parameter.

In a sixth aspect, alone or in combination with one or more of the first through fifth aspects, the TB size is determined based at least in part on a joint determination of the TB size that is a function of both the first set of parameters and the second set of parameters.

In a seventh aspect, alone or in combination with one or more of the first through sixth aspects, the TB size is determined based at least in part on a rule that is commonly applied by a user equipment and a base station that transmit or receive the first TB repetition and the second TB repetition.

In an eight aspect, alone or in combination with one or more of the first through seventh aspects, the wireless communication device is one of a user equipment, a base station, or a transmit receive point.

In a ninth aspect, alone or in combination with one or more of the first through eighth aspects, the first TB repetition and the second TB repetition are transmitted in one of a physical downlink shared channel or a physical uplink shared channel.

In a tenth aspect, alone or in combination with one or more of the first through ninth aspects, the first set of parameters and the second set of parameters include at least one of: different respective first and second modulation and coding schemes, different respective first and second numbers of resource elements, different respective first and second numbers of layers, or a combination thereof.

In an eleventh aspect, alone or in combination with one or more of the first through tenth aspects, the different TTIs are different slots, different mini-slots, or different sets of symbols.

In a twelfth aspect, alone or in combination with one or more of the first through eleventh aspects, the first set of parameters and the second set of parameters are indicated in at least one of: a radio resource control message, downlink control information, or a combination thereof.

In a thirteenth aspect, alone or in combination with one or more of the first through twelfth aspects, the first TB repetition and the second TB repetition are scheduled in different transmission time intervals.

In a fourteenth aspect, alone or in combination with one or more of the first through thirteenth aspects, the first TB repetition and the second TB repetition are scheduled in different resource blocks.

In a fifteenth aspect, alone or in combination with one or more of the first through fourteenth aspects, the first TB repetition and the second TB repetition are scheduled in different spatial layers.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
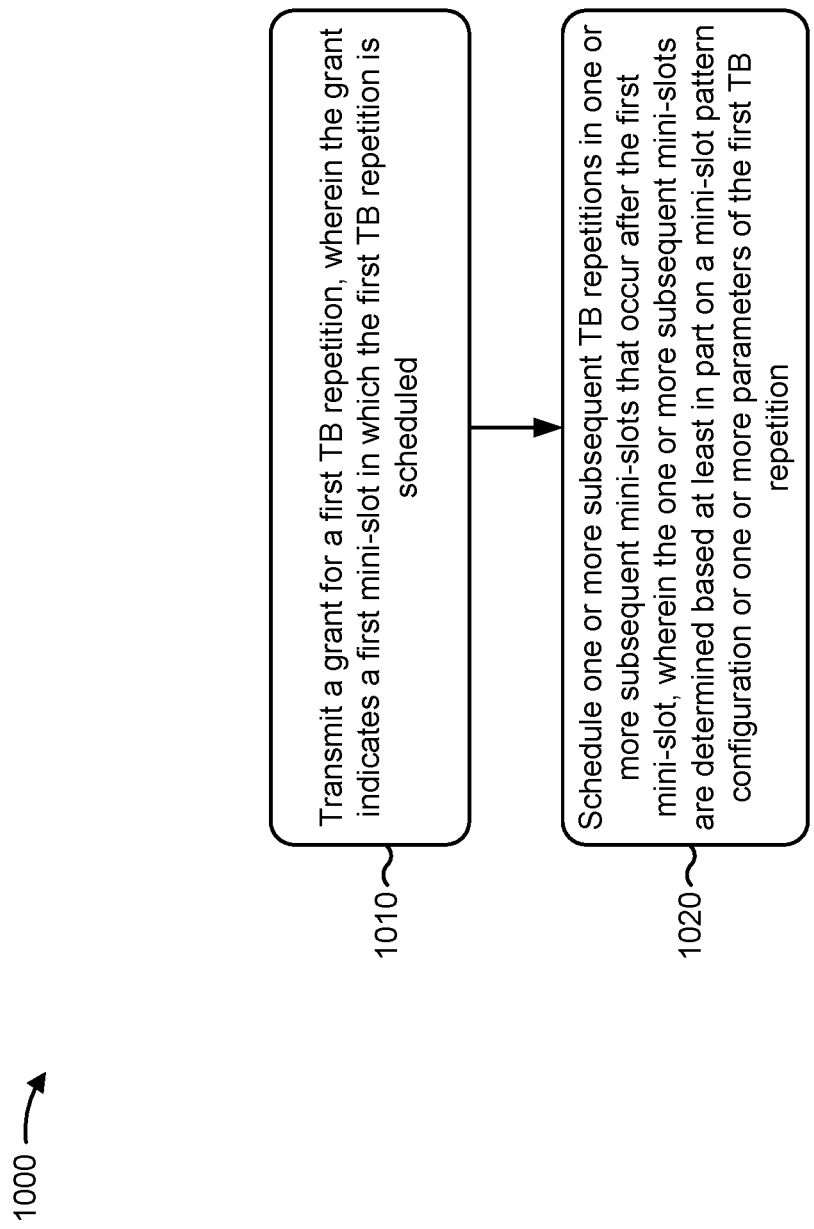

FIG. 10 is a diagram illustrating an example process 1000 performed, for example, by a base station, in accordance with various aspects of the present disclosure. Example process 1000 is an example where a base station (e.g., base station 110, TRP 508, and/or the like) performs operations associated with transport block transmission using different spatial parameters.

As shown in FIG. 10, in some aspects, process 1000 may include transmitting a grant for a first TB repetition, wherein the grant indicates a first mini-slot in which the first TB repetition is scheduled (block 1010). For example, the base station (e.g., using controller/processor 240, transmit processor 220, TX MIMO processor 230, MOD 232, antenna 234, and/or the like) may transmit a grant for a first TB repetition, as described above. In some aspects, the grant indicates a first mini-slot in which the first TB repetition is scheduled.

As shown in FIG. 10, in some aspects, process 1000 may include scheduling one or more subsequent TB repetitions in one or more subsequent mini-slots that occur after the first mini-slot, wherein the one or more subsequent mini-slots are determined based at least in part on a mini-slot pattern configuration or one or more parameters of the first TB repetition (block 1020). For example, the base station (e.g., using controller/processor 240, scheduler 246, and/or the like) may schedule one or more subsequent TB repetitions in one or more subsequent mini-slots that occur after the first mini-slot, as described above. In some aspects, the one or more subsequent mini-slots are determined based at least in part on a mini-slot pattern configuration or one or more parameters of the first TB repetition.

Process 1000 may include additional aspects, such as any single aspect or any combination of aspects described below and/or in connection with one or more other processes described elsewhere herein.

In a first aspect, process 1000 includes transmitting the mini-slot pattern configuration that indicates a pattern of mini-slots, for a time period, associated with TB repetition.

In a second aspect, alone or in combination with the first aspect, a set of parameters, indicated in the grant for the first TB repetition, are used for the one or more subsequent TB repetitions.

In a third aspect, alone or in combination with one or more of the first and second aspects, the set of parameters includes at least one of: a modulation and coding scheme, a frequency domain allocation, a time domain allocation, a starting symbol of the first TB repetition, a length of the first TB repetition, or a combination thereof.

In a fourth aspect, alone or in combination with one or more of the first through third aspects, process 1000 may include transmitting an indication of one or more spatial parameters or one or more redundancy versions corresponding to the one or more subsequent TB repetitions.

In a fifth aspect, alone or in combination with one or more of the first through fourth aspects, the indication is transmitted in the grant or in a radio resource control (RRC) message.

In a sixth aspect, alone or in combination with one or more of the first through fifth aspects, a TB size for the first TB repetition and the one or more subsequent TB repetitions is determined based at least in part on a set of parameters associated with the first TB repetition.

In a seventh aspect, alone or in combination with one or more of the first through sixth aspects, the mini-slot pattern configuration indicates a respective set of symbols occupied by each mini-slot included in the pattern of mini-slots.

In an eighth aspect, alone or in combination with one or more of the first through seventh aspects, the respective set of symbols is indicated by at least one of: a starting symbol and a number of symbols for the respective set of symbols, or a starting symbol and an ending symbol for the respective set of symbols.

In a ninth aspect, alone or in combination with one or more of the first through eighth aspects, the time period is a number of symbols or a number of slots.

In a tenth aspect, alone or in combination with one or more of the first through ninth aspects, the mini-slot pattern configuration is indicated in a radio resource control message.

In an eleventh aspect, alone or in combination with one or more of the first through tenth aspects, process 1000 includes: transmitting the first TB repetition, in the first mini-slot, and the one or more subsequent TB repetitions in the one or more subsequent mini-slots; or receiving the first TB repetition, in the first mini-slot, and the one or more subsequent TB repetitions in the one or more subsequent mini-slots.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
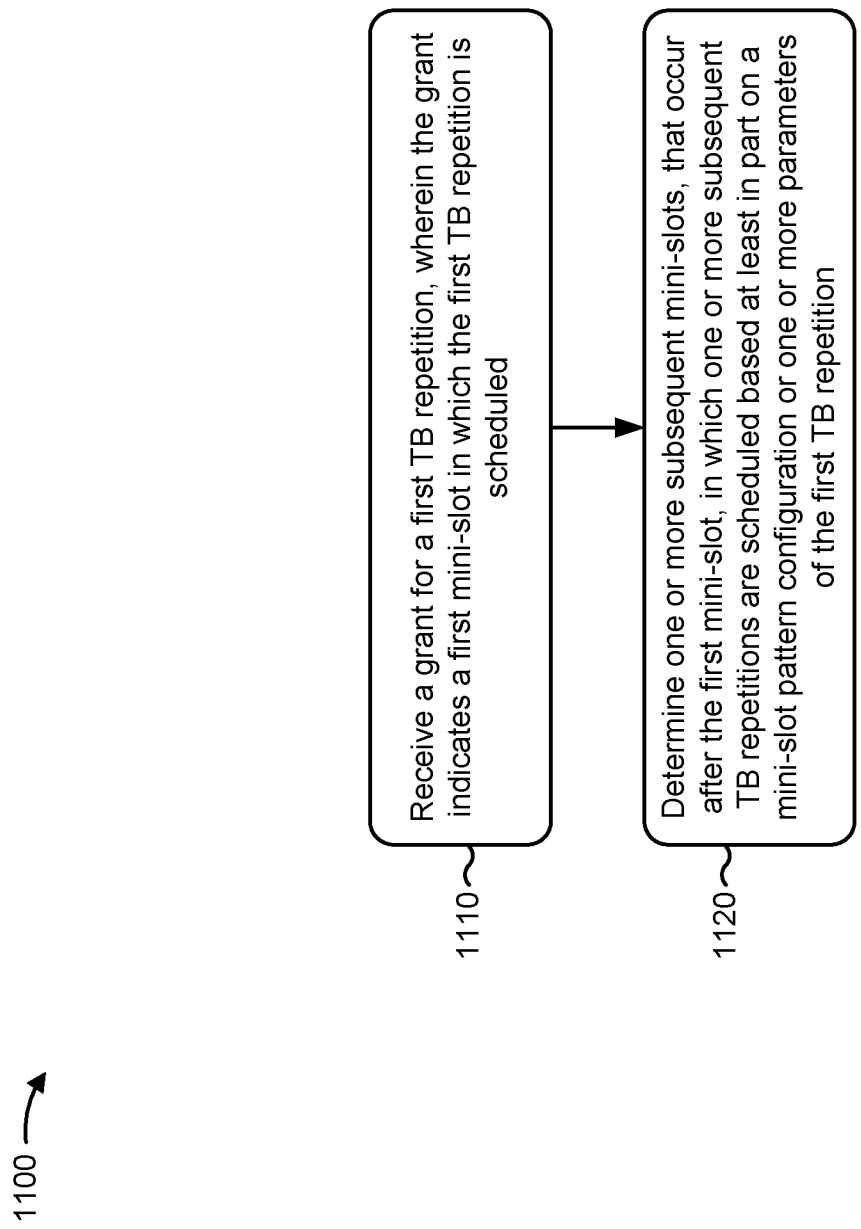

FIG. 11 is a diagram illustrating an example process 1100 performed, for example, by a UE, in accordance with various aspects of the present disclosure. Example process 1100 is an example where a UE (e.g., UE 120 and/or the like) performs operations associated with transport block transmission using different spatial parameters.

As shown in FIG. 11, in some aspects, process 1100 may include receiving a grant for a first TB repetition, wherein the grant indicates a first mini-slot in which the first TB repetition is scheduled (block 1110). For example, the UE (e.g., using antenna 252, DEMOD 254, MIMO detector 256, receive processor 258, controller/processor 280, and/or the like) may receive a grant for a first TB repetition, as described above. In some aspects, the grant indicates a first mini-slot in which the first TB repetition is scheduled.

As shown in FIG. 11, in some aspects, process 1100 may include determining one or more subsequent mini-slots, that occur after the first mini-slot, in which one or more subsequent TB repetitions are scheduled based at least in part on a mini-slot pattern configuration or one or more parameters of the first TB repetition (block 1120). For example, the UE (e.g., using controller/processor 280 and/or the like) may determine one or more subsequent mini-slots, that occur after the first mini-slot, in which one or more subsequent TB repetitions are scheduled based at least in part on a mini-slot pattern configuration or one or more parameters of the first TB repetition, as described above.

Process 1100 may include additional aspects, such as any single aspect or any combination of aspects described below and/or in connection with one or more other processes described elsewhere herein.

In a first aspect, process 1000 includes receiving the mini-slot pattern configuration that indicates a pattern of mini-slots, for a time period, associated with TB repetition.

In a second aspect, alone or in combination with the first aspect, a set of parameters, indicated in the grant for the first TB repetition, are used for the one or more subsequent TB repetitions.

In a third aspect, alone or in combination with one or more of the first and second aspects, the set of parameters includes at least one of: a modulation and coding scheme, a frequency domain allocation, a time domain allocation, a starting symbol of the first TB repetition, a length of the first TB repetition, or a combination thereof.

In a fourth aspect, alone or in combination with one or more of the first through third aspects, process 1100 includes receiving an indication of one or more spatial parameters or one or more redundancy versions corresponding to the one or more subsequent TB repetitions.

In a fifth aspect, alone or in combination with one or more of the first through fourth aspects, the indication is received in the grant or in a radio resource control (RRC) message.

In a sixth aspect, alone or in combination with one or more of the first through fifth aspects, a TB size for the first TB repetition and the one or more subsequent TB repetitions is determined based at least in part on a set of parameters associated with the first TB repetition.

In a seventh aspect, alone or in combination with one or more of the first through sixth aspects, the mini-slot pattern configuration indicates a respective set of symbols occupied by each mini-slot included in the pattern of mini-slots.

In an eighth aspect, alone or in combination with one or more of the first through seventh aspects, the respective set of symbols is indicated by at least one of: a starting symbol and a number of symbols for the respective set of symbols, or a starting symbol and an ending symbol for the respective set of symbols.

In a ninth aspect, alone or in combination with one or more of the first through eighth aspects, the time period is a number of symbols or a number of slots.

In a tenth aspect, alone or in combination with one or more of the first through ninth aspects, the mini-slot pattern configuration is indicated in a radio resource control message.

In an eleventh aspect, alone or in combination with one or more of the first through tenth aspects, process 1100 includes: transmitting the first TB repetition, in the first mini-slot, and the one or more subsequent TB repetitions in the one or more subsequent mini-slots; or receiving the first TB repetition, in the first mini-slot, and the one or more subsequent TB repetitions in the one or more subsequent mini-slots.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
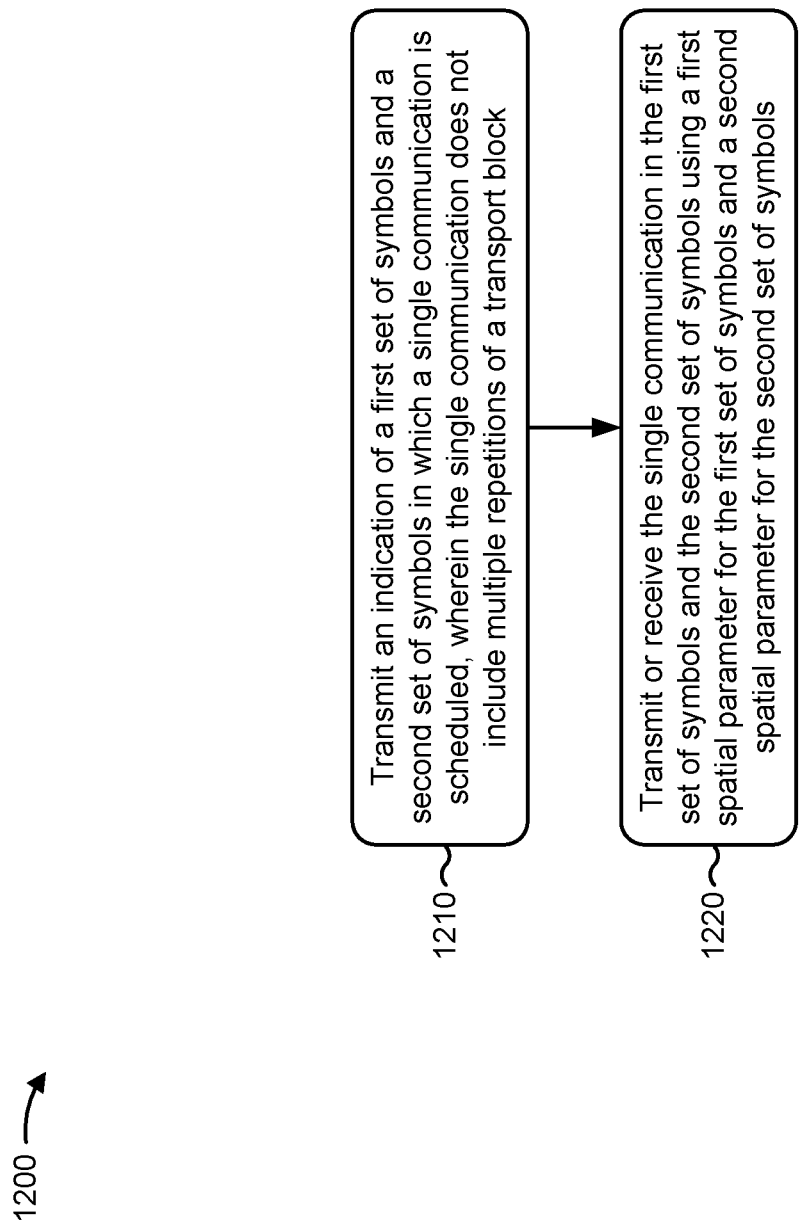

FIG. 12 is a diagram illustrating an example process 1200 performed, for example, by a base station, in accordance with various aspects of the present disclosure. Example process 1200 is an example where a base station (e.g., base station 110, TRP 508, and/or the like) performs operations associated with transport block transmission using different spatial parameters.

As shown in FIG. 12, in some aspects, process 1200 may include transmitting an indication of a first set of symbols and a second set of symbols in which a single communication is scheduled, wherein the single communication does not include multiple repetitions of a transport block (block 1210). For example, the base station (e.g., using controller/ processor 240, transmit processor 220, TX MIMO processor 230, MOD 232, antenna 234, and/or the like) may transmit an indication of a first set of symbols and a second set of symbols in which a single communication is scheduled, as described above. In some aspects, the single communication does not include multiple repetitions of a transport block.

As shown in FIG. 12, in some aspects, process 1200 may include transmitting or receiving the single communication in the first set of symbols and the second set of symbols using a first spatial parameter for the first set of symbols and a second spatial parameter for the second set of symbols (block 1220). For example, the base station (e.g., using antenna 234, DEMOD 232, MIMO detector 236, receive processor 238, controller/processor 240, transmit processor 220, TX MIMO processor 230, MOD 232, and/or the like) may transmit or receive the single communication in the first set of symbols and the second set of symbols using a first spatial parameter for the first set of symbols and a second spatial parameter for the second set of symbols, as described above.

Process 1200 may include additional aspects, such as any single aspect or any combination of aspects described below and/or in connection with one or more other processes described elsewhere herein.

In a first aspect, the indication is an implicit indication based at least in part on a first symbol of a first demodulation reference signal (DMRS) and a second symbol of a second DMRS.

In a second aspect, alone or in combination with the first aspect, the first symbol is a starting symbol of the first set of symbols and the second symbol is a starting symbol of the second set of symbols.

In a third aspect, alone or in combination with one or more of the first and second aspects, the indication is an explicit indication indicated in downlink control information.

In a fourth aspect, alone or in combination with one or more of the first through third aspects, downlink control information indicates the first spatial parameter and the second spatial parameter.

In a fifth aspect, alone or in combination with one or more of the first through fourth aspects, the first set of symbols and the second set of symbols are contiguous.

In a sixth aspect, alone or in combination with one or more of the first through fifth aspects, the first spatial parameter and the second spatial parameter are: respective first and second quasi co-location parameters, respective first and second transmission configuration indicator (TCI) states, respective first and second precoding parameters, respective first and second spatial domain filters, or a combination thereof.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
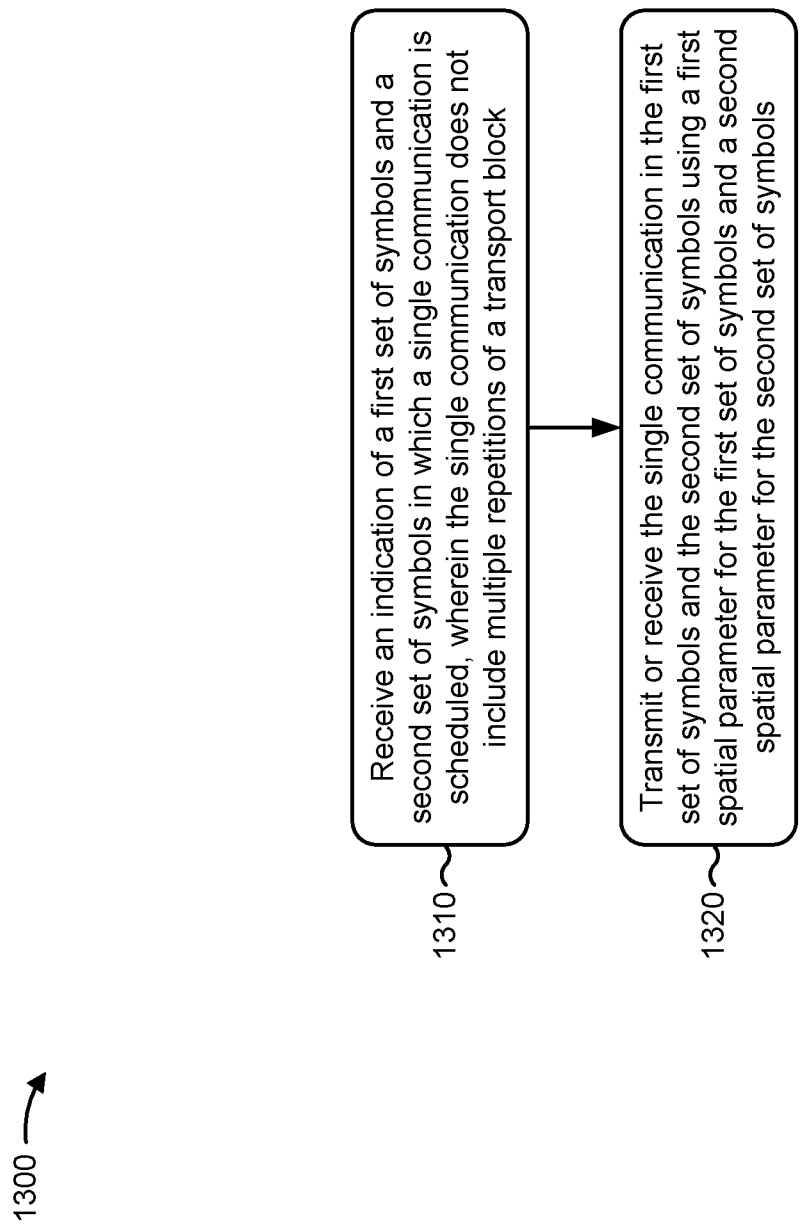

FIG. 13 is a diagram illustrating an example process 1300 performed, for example, by a UE, in accordance with various aspects of the present disclosure. Example process 1300 is an example where a UE (e.g., UE 120 and/or the like) performs operations associated with transport block transmission using different spatial parameters.

As shown in FIG. 13, in some aspects, process 1300 may include receiving an indication of a first set of symbols and a second set of symbols in which a single communication is scheduled, wherein the single communication does not include multiple repetitions of a transport block (block 1310). For example, the UE (e.g., using antenna 252, DEMOD 254, MIMO detector 256, receive processor 258, controller/processor 280, and/or the like) may receive an indication of a first set of symbols and a second set of symbols in which a single communication is scheduled, as described above. In some aspects, the single communication does not include multiple repetitions of a transport block.

As shown in FIG. 13, in some aspects, process 1300 may include transmitting or receiving the single communication in the first set of symbols and the second set of symbols using a first spatial parameter for the first set of symbols and a second spatial parameter for the second set of symbols (block 1320). For example, the UE (e.g., using antenna 252, DEMOD 254, MIMO detector 256, receive processor 258, controller/processor 280, transmit processor 264, TX MIMO processor 266, MOD 254, and/or the like) may transmit or receive the single communication in the first set of symbols and the second set of symbols using a first spatial parameter for the first set of symbols and a second spatial parameter for the second set of symbols, as described above.

Process 1300 may include additional aspects, such as any single aspect or any combination of aspects described below and/or in connection with one or more other processes described elsewhere herein.

In a first aspect, the indication is an implicit indication based at least in part on a first symbol of a first demodulation reference signal (DMRS) and a second symbol of a second DMRS.

In a second aspect, alone or in combination with the first aspect, the first symbol is a starting symbol of the first set of symbols and the second symbol is a starting symbol of the second set of symbols.

In a third aspect, alone or in combination with one or more of the first and second aspects, the indication is an explicit indication indicated in downlink control information.

In a fourth aspect, alone or in combination with one or more of the first through third aspects, downlink control information indicates the first spatial parameter and the second spatial parameter.

In a fifth aspect, alone or in combination with one or more of the first through fourth aspects, the first set of symbols and the second set of symbols are contiguous.

In some aspects, the first spatial parameter and the second spatial parameter are: respective first and second quasi co-location parameters, respective first and second transmission configuration indicator (TCI) states, respective first and second precoding parameters, respective first and second spatial domain filters, or a combination thereof.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code-it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
   communicating a radio resource control (RRC) message including at least one parameter associated with transport block (TB) repetition;
   communicating downlink control information (DCI) including at least one spatial parameter;
   identifying a rule for determining a TB size based on the at least one parameter associated with the TB repetition and the at least one spatial parameter;
   determining a first set of parameters associated with a first TB repetition;
   determining a first TB size based on the identified rule and the first set of parameters; and
   communicating using the first TB size for the first TB repetition and for a second TB repetition, wherein the identified rule indicates to use the first TB size for the second repetition.

2. The method of claim 1, wherein the first TB repetition and the second TB repetition are scheduled in different transmission time intervals.

3. The method of claim 2, wherein the different transmission time intervals are different slots, different mini-slots, or different sets of symbols.

4. The method of claim 1, wherein the first TB repetition and the second TB repetition are scheduled in different resource blocks.

5. The method of claim 1, wherein the first TB repetition and the second TB repetition are scheduled in different spatial layers.

6. The method of claim 1, wherein the wireless communication device is a user equipment.

7. A wireless communication device for wireless communication, comprising:
   memory; and
   one or more processors, coupled to the memory, configured to:
      communicate a radio resource control (RRC) message including at least one parameter associated with transport block (TB) repetition;
      communicate downlink control information (DCI) including at least one spatial parameter;
      identify a rule for determining a TB size based on the at least one parameter associated with the TB repetition and the at least one spatial parameter;
      determine a first set of parameters associated with a first TB repetition;
      determine a first TB size based on the identified rule and the first set of parameters; and
      communicate using the first TB size for the first TB repetition and for a second TB repetition, wherein the identified rule indicates to use the first TB size for the second repetition.

8. The wireless communication device of claim 7, wherein the first TB repetition and the second TB repetition are scheduled in different transmission time intervals.

9. The wireless communication device of claim 8, wherein the different transmission time intervals are different slots, different mini-slots, or different sets of symbols.

10. The wireless communication device of claim 7, wherein the first TB repetition and the second TB repetition are scheduled in different resource blocks.

11. The wireless communication device of claim 7, wherein the wireless communication device is a user equipment.

12. A non-transitory computer-readable medium storing a set of instructions for wireless communication, the set of instructions comprising:
   one or more instructions that, when executed by one or more processors of a wireless communication device, cause the wireless communication device to:
      communicate a radio resource control (RRC) message including at least one parameter associated with transport block (TB) repetition;
      communicate downlink control information (DCI) including at least one spatial parameter;
      identify a rule for determining a TB size based on the at least one parameter associated with the TB repetition and the at least one spatial parameter;
      determine a first set of parameters associated with a first TB repetition;
      determine a first TB size based on the identified rule and the first set of parameters; and
      communicate using the first TB size for the first TB repetition and for a second TB repetition, wherein the identified rule indicates to use the first TB size for the second repetition.

13. The non-transitory computer-readable medium of claim 12, wherein the first TB repetition and the second TB repetition are scheduled in different transmission time intervals.

14. The non-transitory computer-readable medium of claim 13, wherein the different transmission time intervals are different slots, different mini-slots, or different sets of symbols.

15. The non-transitory computer-readable medium of claim 12, wherein the first TB repetition and the second TB repetition are scheduled in different resource blocks.

16. The non-transitory computer-readable medium of claim 12, wherein the wireless communication device is a user equipment.

17. An apparatus for wireless communication, comprising:
- means for communicating a radio resource control (RRC) message including at least one parameter associated with transport block (TB) repetition;
- means for communicating downlink control information (DCI) including at least one spatial parameter;
- means for identifying a rule for determining a TB size based on the at least one parameter associated with the TB repetition and the at least one spatial parameter;
- means for determining a first set of parameters associated with a first TB repetition;
- means for determining a first TB size based on the identified rule and the first set of parameters; and
- means for communicating using the first TB size for the first TB repetition and for a second TB repetition, wherein the identified rule indicates to use the first TB size for the second repetition.

* * * * *